US012027765B2

(12) United States Patent
Hyman et al.

(10) Patent No.: US 12,027,765 B2
(45) **Date of Patent: *Jul. 2, 2024**

(54) CORRUGATED GROUND PLANE APPARATUS FOR AN ANTENNA

(71) Applicant: IXI Technology Holdings, Inc., Yorba Linda, CA (US)

(72) Inventors: Daniel J. Hyman, Long Beach, CA (US); Byron del Castillo, Eastvale, CA (US); Jeffrey Norris, Lake Forest, CA (US)

(73) Assignee: IXI TECHNOLOGY HOLDINGS, INC., Yorba Linda, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/098,097

(22) Filed: Jan. 17, 2023

(65) Prior Publication Data

US 2023/0231306 A1 Jul. 20, 2023

Related U.S. Application Data

(63) Continuation of application No. 17/229,708, filed on Apr. 13, 2021, now Pat. No. 11,557,833.

(51) Int. Cl.

| | |
|---|---|
| ***H01Q 11/08*** | (2006.01) |
| ***H01Q 1/36*** | (2006.01) |
| ***H01Q 1/48*** | (2006.01) |
| ***H01Q 5/45*** | (2015.01) |

(52) U.S. Cl.

CPC ............... *H01Q 1/48* (2013.01); *H01Q 1/362* (2013.01); *H01Q 5/45* (2015.01); *H01Q 11/08* (2013.01)

(58) Field of Classification Search

CPC ........................... H01Q 1/36–48; H01Q 11/08

See application file for complete search history.

(56) References Cited

U.S. PATENT DOCUMENTS

| | | | | |
|---|---|---|---|---|
| 11,502,414 B2 * | 11/2022 | Parsche | .................. | H01Q 9/065 |
| 2012/0146880 A1 * | 6/2012 | Behrens | ................. | B64G 1/222 343/895 |
| 2018/0090830 A1 * | 3/2018 | McMichael | ............ | H01Q 9/145 |
| 2021/0194140 A1 * | 6/2021 | Parsche | .................. | H01Q 11/08 |

* cited by examiner

*Primary Examiner* — Hasan Islam

(74) *Attorney, Agent, or Firm* — Jovan N. Jovanovic; The Watson IP Group, PLC

(57) ABSTRACT

An antenna comprises an axial helical radiating element and a corrugated ground plane. The axial helical radiating element provides a radiation pattern substantially parallel to a primary axis of rotation of the helical radiating element. The corrugated ground plane, disposed proximate to a back region of the antenna, comprises corrugations to increase an electrical length of travel for radial standing waves between an axial helical input, at which the axial helical radiating element is coupled to the corrugated ground plane, to an outer edge of the corrugated ground plane.

20 Claims, 8 Drawing Sheets

CORRUGATED GROUND PLANE APPARATUS FOR AN ANTENNA

CROSS-REFERENCE TO RELATED APPLICATION

The present application is a continuation of U.S. patent application Ser. No. 17/229,708 filed on Apr. 13, 2021, entitled "CORRUGATED GROUND PLANE APPARATUS FOR AN ANTENNA", the entire specification of which is hereby incorporated by reference in its entirety.

BACKGROUND OF THE DISCLOSURE

1. Field of the Disclosure

The disclosure relates in general to an antenna, and more particularly, to a corrugated ground plane apparatus for an antenna.

2. Background Art

Antennas with high gain are typically electrically large (meaning large for their frequency in terms of wavelengths) in multiple dimensions. End-fire helical antennas with single-feed points through a ground plane are a type of antenna that can readily achieve +12 to +14 dBi. The ground plane provides not only a rear reflecting surface for radiating waves, but it also supports a standing wave on the plane itself that can provide an additional +1 to +2 dB of realized gain over the performance of an infinite ground plane if designed properly. Multiple developers and researchers have analyzed flat square and circular ground planes, showing theoretical ground planes of 0.5 to 0.75 lambda achieving optimum results for very narrowband designs. However, broadband designs have found designs between 0.75 and 1.0 lambda ground plane size perform better due to a wider frequency response. Researchers using modern computational techniques across broader frequency ranges have determined the optimum size of a square ground plane is 1.5 lambda.

Specific ground plane shaping into other structures such as a cylindrical cup and a truncated cone has shown providing up to +4 dB of additional gain. The optimum cylindrical cup has a circular ground plane region of diameter 1.0 lambda and forward sidewalls 0.25 lambda. This is similar to the 1.5 lambda total standing wave length but with added benefits of radiation from the circular forward diameter with an additional +1 dB realized gain. A truncated cone having minor radius 0.75 lambda, major radius of 2.5 lambda, and total vertical height of 0.5 lambda outperforms all other options at the cost of larger cross-sectional diameter. These concepts work well when a platform can be outfitted with large antennas, such as fixed sites and for large ground vehicle mounts. But these do not work in deployable systems, man-portable and handheld systems, and aeronautical systems where the cross-section of an antenna significantly affects size, weight, and wind resistance.

In the case of coaxial helical end-fire antennas having two helical coils around the same axis, the standing waves of both frequencies should ideally be considered in the sizing of the antenna ground plane. There will be specific sizes of ground planes that will be ideal for consideration, in that the radii of the ground plane for reflection of the standing waves will be wavelength-dependent distances for both frequencies. Coaxial helical end-fire antennas having three or more helical coils will be even more complex with more wavelength-dependent options to match. The problem is that the sizes providing beneficial standing waves become limited when multiple frequencies must be considered and optimized.

SUMMARY OF THE DISCLOSURE

The disclosure is directed to an antenna comprising an axial helical radiating element and a corrugated ground plane. The axial helical radiating element provides a radiation pattern substantially parallel to a primary axis of rotation of the helical radiating element. The corrugated ground plane, disposed proximate to a back region of the antenna, comprises corrugations to increase an electrical length of travel for radial standing waves between an axial helical input, at which the axial helical radiating element is coupled to the corrugated ground plane, to an outer edge of the corrugated ground plane.

In some configurations, the corrugated ground plane further comprises a dielectric substrate, the corrugations being radial path segments disposed on the dielectric substrate.

In some configurations, the dielectric substrate is a printed circuit board (PCB), with the radial path segments being a conductive material formed on the PCB.

In some configurations, at least one of a material thickness and a dimension of the radial path segment are quarter-wavelengths or harmonic of one or more frequencies of operation of the antenna.

In some configurations, the PCB includes at least one via to electrically and mechanically couple a first radial path segment disposed on a first side of the PCB to a second radial path segment disposed on a second side of the PCB.

In some configurations, the conductive material is at least one of copper, silver, aluminum, nickel, gold, an alloy of at least one of copper, silver, aluminum, nickel, gold, and a solder compatible with at least one of copper, silver, aluminum, nickel, and gold.

In some configurations, the radial path segments include at least one radial path segment that is embedded within the PCB substrate.

In some configurations, the corrugated ground plane is circular in shape.

In some configurations, the corrugated ground plane further comprises a central ground plane region, the axial helical input being disposed on the central ground plane region of the corrugated ground plane.

In some configurations, the antenna operates across at least one of Global Navigation Satellite System (GNSS) frequencies, global cellular bands, and Unlicensed National Information Infrastructure (UNII) bands.

In some configurations, the axial helical radiating element is a first axial helical radiating element, the antenna further comprising a second helical radiating element disposed proximate to the first helical radiating element and along a same centerline axis.

In some configurations, the corrugations include a plurality of rises electrically connected to a plurality of trenches.

In at some configurations, the plurality of rises and the plurality of trenches are toroidal or ring-shaped.

In some configurations, the plurality of rises includes three rises and the plurality of trenches includes three trenches.

In some configurations, the corrugated ground plane further comprising at least one threaded hole.

In some configurations, the corrugated ground plane further comprising at least one non-threaded mounting hole.

In some configurations, the antenna further comprises a radiator frame to provide mechanical support to the axial helical radiating element.

In some configurations, the trenches and rises can be toroidal or ring-shaped.

In some configurations, the corrugated ground plane antenna further comprises at least one through-holes for mechanical fixturing.

In some configurations, the through-holes are conductive.

In some configurations, the through-holes are isolated from the corrugated ground plane by a dielectric.

In some configurations, the antenna further comprises a frame contact to couple a radiator frame to the corrugated ground plane, the frame contact being axially non-centered to provide capacitance to the corrugated ground plane.

In some configurations, the corrugations include a first radial path segment and a second radial path segment, the corrugated ground plane further comprises passive radio-frequency circuitry disposed between the first and second radial path segments to provide frequency-varying phase advancement for surface currents.

In some configurations, the corrugated ground plane further comprises dielectric elements between, above, and/or below corrugation elements to provide dielectric loading for an increase in frequency-dependent electrically equivalent path length.

BRIEF DESCRIPTION OF THE DRAWINGS

The disclosure will now be described with reference to the drawings wherein.

DETAILED DESCRIPTION OF THE DISCLOSURE

Figure 1:
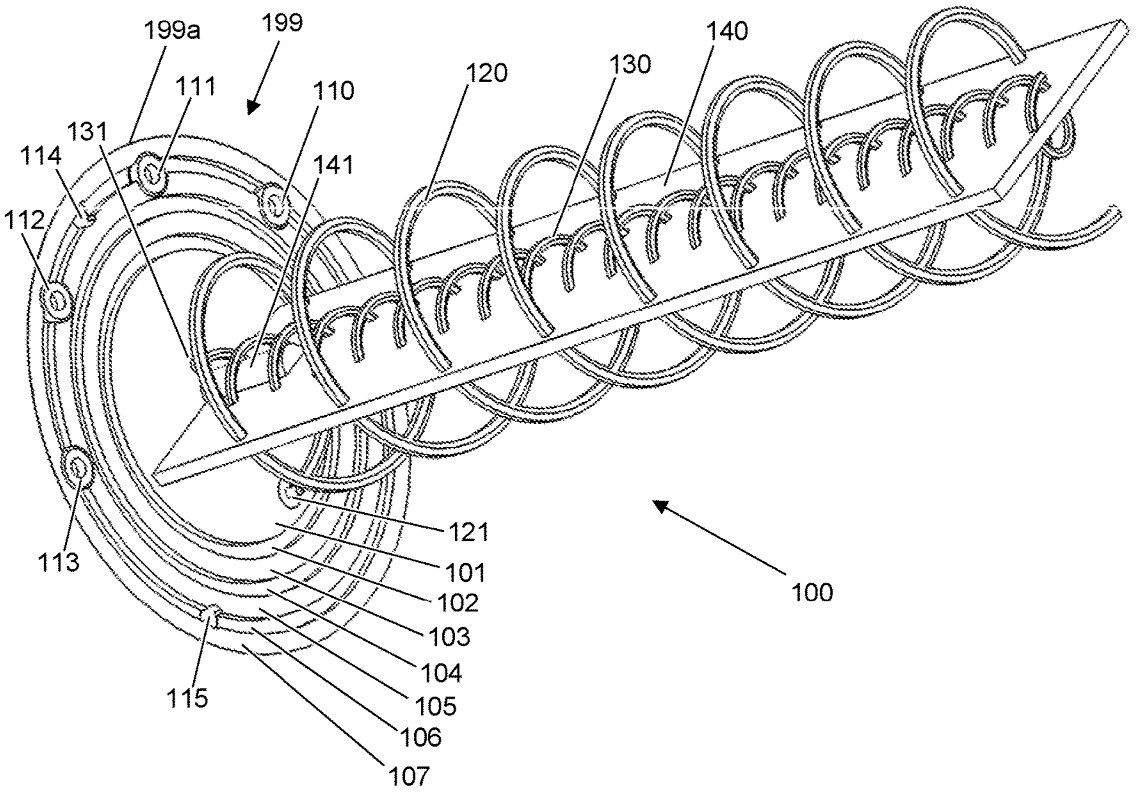
FIG. 1 illustrates an isometric front side view of an example corrugated ground plane antenna, in accordance with at least one configuration disclosed herein.

While this disclosure is susceptible of configuration(s) in many different forms, there is shown in the drawings and described herein in detail a specific configuration(s) with the understanding that the present disclosure is to be considered as an exemplification and is not intended to be limited to the configuration(s) illustrated.

It will be understood that like or analogous elements and/or components, referred to herein, may be identified throughout the drawings by like reference characters. In addition, it will be understood that the drawings are merely schematic representations of the configurations disclosed, and some of the components may have been distorted from actual scale for purposes of pictorial clarity.

There is a need for at least one helical antenna that works well at frequencies that specifically include one or more commercial bands such as 5.8 GHz, 5.2 GHz, 2.4 GHz, and video and other data bands at lower frequencies. These frequencies utilize a broad bandwidth with high gain for point to multi-point or mobile point to point applications. For mobile systems, especially systems mounted on aerial platforms, achieving high gain in a compact form factor with low cross section is a challenge. In accordance with at least one configuration, at least one corrugated ground plane antenna is disclosed that can operate at a high realized antenna gain value and industry-acceptable input reflection across desirable frequency bands, within a compact form factor (e.g., approximately 7.5" in length and approximately 3.7" in cross-sectional diameter).

At least one configuration of at least one of the corrugated ground plane antenna disclosed herein can operate across commonly used Global Navigation Satellite System (GNSS) frequencies for all presently deployed systems. At least one configuration can operate across multiple global cellular (e.g., Universal Mobile Telecommunications System (UMTS)/3G/4G) bands. At least one configuration can operate across the commonly used unlicensed and Unlicensed National Information Infrastructure (UNII) bands used by the majority of consumer Radio Frequency (RF) communications devices.

Such performance can be achieved through one or more of a design(s) of the one or more helical radiating elements, one or more input feed connectors interfacing the one or more helical radiating elements, and control of standing waves in the field regions of a corrugated ground plane across the supported operating frequency bands. In at least one configuration, each of these elements can be operated together in an integrated fashion to achieve radiating characteristics desired.

Referring now to the drawings and in particular to FIG. 1, at least one configuration is disclosed that includes an apparatus, such as a physically corrugated ground plane coaxial antenna (PCGPCA) 100, a front isometric view of which is illustrated as including a physically corrugated ground plane 199, and a first axial helical radiating element 120 physically connected to a central ground plane region 101 at a first axial helical input 121. In at least one configuration, the PCGPCA 100 also includes a second axial helical radiating element 130 physically connected to the central ground plane region 101 at a second axial helical input 131, which is partially obstructed in the isometric view of FIG. 1 by a winding of the first axial helical radiating element 120. In at least one configuration, the PCGPCA 100 can further comprise a Radio Frequency (RF) connector (not shown) each with a center conductor electrically connected to the first and second helical radiating elements 120, 130 and ground conductor electrically connected to conductive material surrounding the first and second axial helical inputs 121, 131.

The second axial helical radiating element 130 is shown as being smaller in diameter than the first axial helical radiating element 120 and disposed proximate to the first axial helical radiating element 120, such as within the first axial helical radiating element 120, such that the overall length of the first and second axial helical radiating elements 120, 130 is approximately equal. The first and second axial helical radiating elements 120, 130 are physically positioned approximately along a same axis extending from and normal to a center of the central ground plane region 101 and are constrained by a radiator frame 140 (e.g., dielectric), which is itself physically connected to the central ground plane region 101 by a frame contact 141. The first and second axial helical radiating elements 120, 130 provide a radiation pattern substantially parallel (+−5 degrees) to a primary axis of rotation of the first and second helical radiating elements 120, 130.

A corrugated nature of the corrugated ground plane 199 is physically manifested in a concentric manner around the central ground plane region 101 through corrugations, such as an undulating series of depressions and rises seen in FIG. 1, although other configurations are possible without departing from the scope of this disclosure. The corrugated ground plane 199 is disposed proximate to a back region of the PCGPCA 100, as shown. A first trench 102 is mechanically and electrically connected to the central ground plane region 101 proximate to its radial extents. The first trench 102 has a lower surface physically below a planar surface of the central ground plane region 101 shown in a toroidal fashion and projecting a short distance in a radial direction. The distance in the radial direction in the example of FIG. 1 is 0.1" before the undulating corrugation physically rises back to an upper surface physically in plane with the central ground plane region 101. This upper surface is a first rise 103 mechanically and electrically coupled to the first trench 102 along its outer circumference. An upper surface of the first trench is in a similar toroidal structure with a radial width of 0.14".

The pattern of trenches continues across the surface of the corrugated ground plane 199 with a second trench 104 connected to the first rise 103 with similar geometry as the first trench 102. Following is a second rise 105 coupled to the second trench 104, also with similar radial geometry as the first rise 103. Continuing the pattern is a third trench 106 coupled to the second rise 105, and a third rise 107 completing the pattern, both features having similar geometries in the radial dimension as previous equivalent features, but with monotonically increasing radii of curvature to form a pattern of rings mechanically and electrically connected.

The corrugated ground plane 199, and corrugated ground planes 499, 999, 1099, and 1199, each discussed below, increases the effective electrical length of travel for radial standing waves between a central region proximate to a base of a radiating element, such as bases of the first and second axial helical inputs 121, 131, respectively, to an outer edge 199*a* of the corrugated ground plane 199. In at least one configuration, the corrugated ground plane 199 can have elements of its structure that are non-planar, such as sidewalls that project forward from a planar region in the same axis and direction as the first and second axial helical radiating elements 120, 130. In at least one configuration, the corrugated ground plane 199 can contain non-planar elements that create a cylindrical, truncated cone, or truncated pyramidal shape. The corrugated ground plane 199 can be formed through various manufacturing methods. For example, the corrugated ground plane 199 can be stamped into shape from a flat piece of metal. Alternatively, the corrugated ground plane 199 can be comprised of an aluminum sheet with the trenches and rises described herein machined into top and bottom surfaces thereof.

In at least one configuration, the PCGPCA 100, and in particular the corrugated ground plane 199, can include one or more mounting holes for attachment to other objects in a radio frequency system. The PCGPCA 100 of FIG. 1 is configured with a first threaded hole 110 outfitted with screw threads appropriate for attachment of threaded hardware including screws, such as those having a 4-40 diameter and thread pitch. The first threaded hole 110 is mechanically and electrically connected to the corrugated features including the second rise 105, third trench 106, and third rise 107. Three (3) additional threaded holes are also present in the PCGPCA 100 including the second threaded hole 111, the third threaded hole 112, and the fourth threaded hole 113. Each of these additional threaded holes is configured in a similar manner as the first threaded hole 110 and arranged in an angular rotated manner about the mutual central axis of the coaxial first and second helical radiating elements 120, 130.

Additional mounting holes are provided for in the PCGPCA 100, specifically the corrugated ground plane 199, that are not threaded and used for different hardware mounting techniques. A first mounting hole 114 and a second mounting hole 115 are positioned near the outer edge 199*a* of a structure of the corrugated ground plane 99 in a similar manner as the threaded holes but physically separated from the threaded holes to provide space for hardware fasteners, neither shown nor further discussed.

Although fix (6) total threaded and unthreaded mounting holes are illustrated in FIG. 1, the number of mounting holes through the PCGPCA 100 can be more or less, dependent upon a particular mounting configuration. Moreover, in at least one other configuration other mounting configuration can be used with the PCGPCA 100, such as one or more mounting brackets (not shown) attached to the corrugated ground plane 199 without degrading the content of the presently disclosed subject matter.

Radio waves emanate from the PCGPCA 100 in an axial end-fire manner from the first and second helical radiating elements 120 130 away from the corrugated ground plane 199. In addition, radio waves emit from the standing waves established on the corrugated ground plane 199 itself and radiating outward in both the axial forward and backwards directions. The design spacing is configured such that the forward emissions from the corrugated ground plane 199 standing waves are constructively interfering with the emissions from the first and second helical radiating elements 120, 130 such that the overall emissions are increased as compared to emissions from helical radiating elements having an infinite ground plane. In the example of FIG. 1, these emission improvements are approximately +1 dB of additional gain provided by a properly sized corrugated ground plane 199.

In at least one configuration, the PCGPCA 100 has a corrugated ground plane that is circular. However, the corrugated ground plane can be other shapes including square, rectangular, pentagonal, hexagonal, ovoid, or any other shape that establishes standing waves of radio-frequency currents. In at least one configuration, the PCGPCA 100 has a corrugated ground plane that is 1.65" in circular radius with corrugation trench to rise sidewalls that are 0.06" in height. This size supports beneficial standing waves for frequencies between 2400 and 2483.5 MHz as well as frequencies between 5150 and 5850 MHz that constructively interfere with radiated emissions from the coaxial helical radiators 120 and 130. However, the corrugated ground plane can be other sizes to support establishing standing waves of radio-frequency currents.

In at least one configuration, the material of corrugated ground plane 199 is rolled sheet aluminum that has been machined to form the trench and rise structures of the corrugations. It is further contemplated that in other configurations the corrugated ground plane 199 may be comprised of other materials that are conductors, including but not limited to aluminum stock or its alloys made by other forming methods, copper and its alloys, any of various types of steels, heavily doped semiconductors such as silicon or gallium arsenide, conductive polymers, conductive nanofiber composites, superconducting materials, and other liquid, solid, and composite homogenous and heterogenous conductors used in radio frequency component design.

It is further contemplated that in other configurations, the corrugated ground plane 199 may be fashioned by other techniques including but not limited to machining, molding, casting, electrical discharge machining, 3-D printing, selective doping, self-assembly through surface tension, and other additive, subtractive, electron mobility manipulation/percolation, and motive energy management techniques for forming conductors.

In at least one configuration, the physical size of the first helical radiating element 120 is 0.91" thick wire coiled into a 1.55" diameter helix, with 0.912" pitch between coils. Additionally, a length of the first helical radiating element 120 can be eight (8) windings, for a total length of approximately 7.4".

Sizes can vary for first helical radiator to provide for different frequencies of operation as well as bandwidth and minor impact on realized gain. In some configurations, such as for very high frequency applications at millimeter wave and THz frequencies, windings of the first and second helical radiating elements 120, 130 can be extremely thin, down to 1 um of structured material and/or can have coils with radii as low as 10 um. In some configurations such as for very low frequency applications as in long-wave radio astronomy applications, windings of the first and second helical radiating elements 120, 130 can be extremely thick, up to 2 meters of structured material and/or can have coils with radii as large as 50 m. Pitch will generally vary in a similar manner as radii with a wide range available to the antenna designer based primarily on the frequency of interest.

Length can vary for first helical radiator 120 to provide for different realized gain and beamwidth. Designs with particularly low gain requirements and/or wide beamwidth requirements can only have a single coil pitch in total helical length. Configurations with particularly high gain requirements and/or narrow beamwidth requirements can have as many as 40 coil pitches in length.

In at least one configuration, the physical size of the second helical radiator 130 is 0.063" thick wire coiled into 0.5" diameter helix, with 0.375" pitch between coils. Additionally, a length of the second helical radiator 130 can be twenty (20) windings, for a total length of 7.6". However, sizes for the second helical radiator 130 can vary in a similar manner as with the first helical radiator 120.

In at least one configuration, a material of the first and second helical radiating elements 120, 130 is drawn copper that has been plastically deformed into a coiled shape then sealed with a polymer coating to deter oxidation. It is further contemplated that in other configurations the first and second helical radiating elements 120, 130 can be comprised of other materials that are conductors, including but not limited to copper wire or its alloys made by other forming methods, aluminum and its alloys, any of various types of steels, conductive polymers, conductive nanofiber composites, superconducting materials, and other liquid, solid, and composite homogenous and heterogenous conductors used in radio frequency component design.

In at least one configuration, a physical size of the radiator frame 140 which provides mechanical support as well as coupling between the coils of the first and second helical radiating elements 120, 130 is 0.06" thick and 7.6" long. However, a physical size of radiator frame 140 can vary.

In at least one configuration, the radiator frame 140 can be 60-mil thick Isola FR408 material. A physical size of the radiator frame 140 provides mechanical support to the first and second axial helical radiating elements 120, 130, as well as coupling between the first and second axial helical radiating elements 120, 130. This material has a design-in dielectric constant of approximately 4.4 at the frequencies described herein. Thus, the radiator frame 140 can be readily manufactured in high-volume printed circuit card processes and materials. In at least one configuration, the radiator frame 140 has no metal layers and no vias. This configuration for the radiator frame 140 provides for a very low-cost antenna design that can readily be scaled to high-volume manufacturing by numerous domestic and overseas printed circuit board (PCB) fabrication service providers.

A wide variety of printed circuit board and polymer materials may be used for the radiator frame 140 without departing from the scope of the features disclosed herein. For example, such features can include, but are not limited to, numerous FR-4 variants and other epoxy-filled glass fiber printed circuit board materials from many vendors, polypropylene, polyester, nylon and its numerous variants, esoteric materials such as Rogers RO4350B, and other polymer, epoxy, glass fiber, and dielectric materials used in the microwave components and circuits industry.

Figure 2:
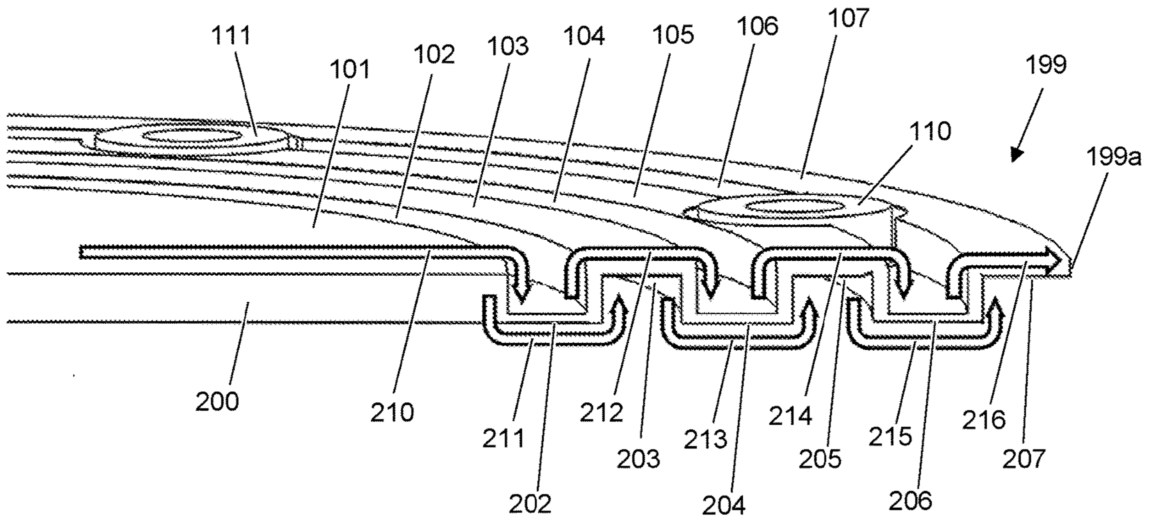
FIG. 2 illustrates a cross-sectional schematic illustration of the corrugated ground plane of the corrugated ground plane antenna shown in FIG. 1, in accordance with at least one configuration disclosed herein.

A cross-section of the corrugated ground plane 199 is shown in FIG. 2 to provide clarity on morphology and describe its function. Many of the same features are visible on the top side of the cross-section, starting with the description of the corrugations surrounding the central ground plane region 101 extending from the ground plane body 200. The first trench 102 descends below the nominal planar surface of the central ground plane region 101 followed by a first rise 103, second trench 104, second rise 105, third trench 106, and third rise 107 to the outer edge of the corrugated ground plane 199. Also seen in the background are the first threaded hole 110 and second threaded hole 111 previously described as a matter of interest to see their relationship with the corrugations shown.

The features described in FIG. 2 detail the function of the corrugations as implemented in physical form, including the features of the lower surface described above. The bottom of the first trench 102 is shown as the first trench floor 202, which is shown to be mechanically and electrically connected to the central ground plane region 101 and bulk of the ground plane body 200. The thin path continues across until meeting the first rise 103, which is shown with its accompanying first rise underside 203. This feature ensures that any current traveling from the first trench 102 to the second trench 104 must travel up to and laterally across the first rise 103 first.

In an analogous fashion, the second trench 104 has an accompanying second trench floor 204 and the second rise 105 has an accompanying second rise underside 205. Continuing this pattern, the third trench 106 has a third trench floor 206 and the third rise 107 has its third rise underside 207 all the way to the PCGPCA 100 radial extent.

One function of the corrugations depends on both the trench and rise functions to increase the path taken by surface currents as compared to a typical design without corrugations having the same radial circumference of ground plane. A central surface current 210 is comprised of radio frequency waves of changing current directions as driven by the changing electric and magnetic fields of a travelling wave as known to those skilled in the art of radio frequency component design. In FIG. 2, this wave is a standing wave at 5800 MHz supported by this design. The central surface current 210 would traverse across the upper surface of the central ground plane region 101 as in a typical ground plane design up until it reaches the first trench 102. The increasing phase state of the standing wave is illustrated as proceeding in the direction shown by the arrowhead on the central surface current 210 and continuing through other current segments as described.

The standing wave continues along the conducting path towards the extents allowed and must therefore travel down along the first trench 102 sidewall down to the first trench floor 202. This second segment of standing wave currents is a first trench current 211 which must travel across the trench floor 202 and up the radially far sidewall of the first trench to the next segment. The wave continues as a first rise current 212 up and across the first rise 103 to the nearest sidewall of the second trench 104.

The path of the standing wave current continues in an analogous fashion, traversing sidewalls, trenches, and rises until reaching the radial extent of the corrugated ground plane 199. The fourth segment is a second trench current 213 across the second trench floor 204 to its far sidewalls. The fifth segment is a second rise current 214 traversing the second rise 105, the sixth segment is a third trench current 215 traversing the third trench floor 206, and the seventh segment is a third rise current 216 traversing the third rise 107.

In each case, rise currents are forced to track the trench sidewalls up to the rise due to the presence of the first rise underside 203, second rise underside 205, and third rise underside 207. Without these features, a subset of the current content would traverse the shorter path directly across a smooth bottom surface of the corrugated ground plane 199, and the standing wave would not be maintained for that fraction of the current.

In at least one configuration, each trench floor and rise ceiling is 0.03" thick and the sidewalls between each trench and each rise are 0.04" thick. Other thicknesses may also be used subject to the constraints of the fabrication technique, material, and frequency of design. In accordance with radio frequency component design, the height of each trench sidewall as well as the thickness of each floor and rise ceiling can be configured to be less than $1/10^{th}$ the wavelength of the highest frequency of operation of the PCGPCA 100 so as to minimize the effect of these discontinuities on the traveling wave. It is further recognized that if the trenches and risers had dielectric material disposed within or upon them, that the wavelength of operation will change due to the loading effects of these dielectric materials on the properties of surface propagation. In yet other configurations, it is contemplated that the trench depth, riser height, trench width, riser width, and/or thickness characteristics may be designed to be quarter-wavelength resonant, or a harmonic thereof, of one of more frequencies of operation of the PCGPCA 100.

When considering the total path length that supports the traveling wave, the total path length up and down the sidewalls of the trenches gets counted in the distance, so long as the distances are small compared to the wavelength of the signal. In at least one configuration, the signal travels through six additional sidewalls above and beyond the planar lateral distance traveled along the trench floors and riser ceilings. With each sidewall being 0.06" in length, the total distance traveled is 0.36" longer than the travel length of a typical non-corrugated ground plane of equivalent radius. To achieve a similar performance as the corrugated ground plane 199, a typical non-corrugated ground plane would have to have a radius 0.36" larger and take require additional area for mounting.

Because the corrugated ground plane 199 is smaller in radius and has trenches and riser cavities manifested into a structure of the corrugated ground plane 99, this component is a lighter weight than a typical ground plane lacking these features. If enclosed in a housing or radome (not shown), the housing or radome for the PCGPCA 100 can be smaller in at least two dimensions and therefore lighter in weight as well. Reduced planar area and associated volume also reduces the wind loading and aerodynamic resistance, which reduces the mechanical strength requirements of masts, framing members, and other components of a radio frequency system, further reducing weight and cost.

Figure 3A:
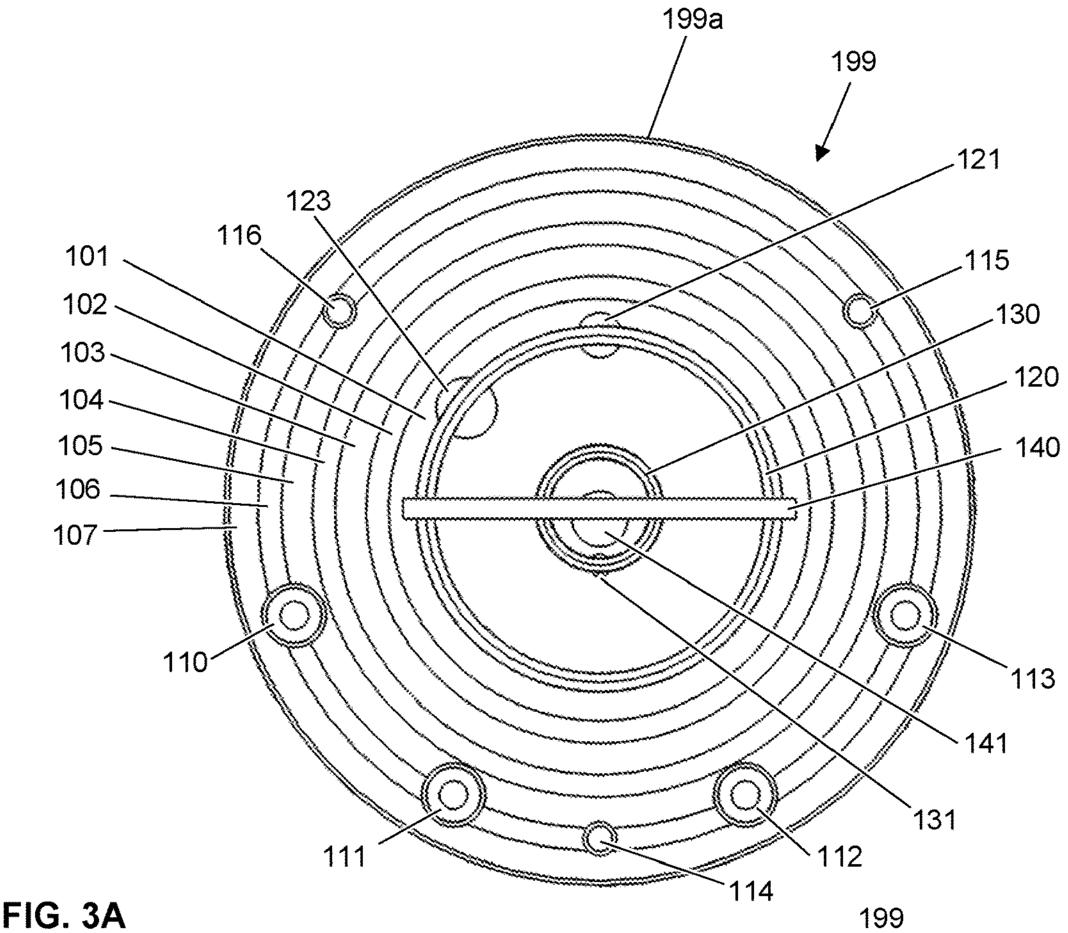
FIG. 3A illustrate a front side view of the corrugated ground plane antenna shown in FIG. 1, in accordance with at least one configuration disclosed herein.

The radial orientation of the disclosed trenches and rises disclosed herein of the PCGPCA 100 are seen clearly in the plan-view schematic illustration of FIG. 3A. The central ground plane region 101 is seen to be oriented about a common center axis shared with the first helical radiating element 120, second helical radiating element 130, and radiator frame 140. The trenches and rises surround the central ground plane region 101 in an annular concentric fashion, although the topography of in-plane and out-of-plane features are not evident in plain view. In at least one configuration, the disclosed trenches and rises can be toroidal or ring-shaped, as shown. The first trench 102 is seen to be first adjacent to the central ground plane region 101 and is itself surrounded by the first rise 103, second trench 104, second rise 105, third trench 106, and third rise 107 to an outer rim of the corrugated ground plane 199. Geometries and dimensions are as previously detailed, and the concentric nature is clarified in FIG. 3A.

The mounting hole configurations are clarified in FIG. 3A, showing four (4) threaded holes in this view for at least one configuration of PCGPCA 100. A first threaded hole 110, second threaded hole 111, third threaded hole 112, and fourth threaded hole 113 are seen clearly to be arrayed in an angular fashion near the outer rim of the corrugated ground plane 99. These holes can be formed sufficiently large to span multiple trench/rise features, and therefore do provided limited shortened paths for traveling waves, although smaller holes are possible. These partial shortened paths will degrade the uniformity of standing waves and/or frequency response of optimal bandwidth for overall effective antenna gain of the PCGPCA 100. In practice, however, the degradation is low for a hole(s) that are small in relative angular projection compared to the full 360 degrees of available directions for surface currents to travel. If the holes were several times the size, or there were several times this many, then their presence and potential antenna gain and pattern degradation may require design changes to accommodate the availability of shortened (corrugation spanning conduction) and/or absent (non-conduction across holes) current paths. Accommodating such structures with revised corrugations, hole design, or dielectric isolation in accordance with this disclosure are tasks known to those skilled in the art of radio frequency component design.

FIG. 3A also shows three (3) visible non-threaded mounting holes in this view for at least one configuration of PCGPCA 100. A first mounting hole 114, second mounting hole 115, and third mounting hole 116 are arranged about the central axis and provide non-threaded mounting options. Similar constraints on current path interaction are present with non-threaded mounting holes as with threaded mounting holes. In each case, the mechanical integrity of the corrugated ground plane 199 surrounding the mounting holes shall be considered in the design process as known by those skilled in the art of mechanical component design.

The connection of the first and second axial helical radiating elements 120, 130 in FIG. 3A is arranged in a similar fashion throughout the central ground plane region 101. The first axial helical radiating element 120 is coupled to a first axial helical input 121, the second axial helical radiating element 130 is coupled to a second axial helical input 131, each partially obstructed in plain view by their own windings. The two inputs are seen to be separated by the greatest distance possible for a flat ground plane area.

In at least one configuration, the mechanical and electrical connection of radiating elements are performed throughout the non-corrugated central ground plane region 101. It is contemplated that in other configurations, the mechanical and electrical connection of one or more radiating elements can be performed in regions that include one or more trenches and/or rises. In such configurations, the current path may be designed to match one frequency for standing waves but not match other frequencies. In such configuration(s), the current path may be designed to specifically reject certain frequencies to improve isolation of those frequencies from one or more radiating elements and radiating element feeds.

Between the first axial helical input 121 and second axial helical input 131 is a frame contact 141 which is used to couple or affix the radiator frame 140 to the central ground plane region 101. The frame contact 141 is not axially centered by design, as its proximity to the second axial helical input 131 provides additional capacitance to the corrugated ground plane 199 as RF energy launches from the second axial helical input 131 into the second helical radiator 130. The first helical radiator 120 has a separate first tuning element 123 located approximately 55 degrees counter-clockwise along the curved path of the first helical radiator 120 coil that performs an equivalent function for the lower frequency.

Figure 3B:
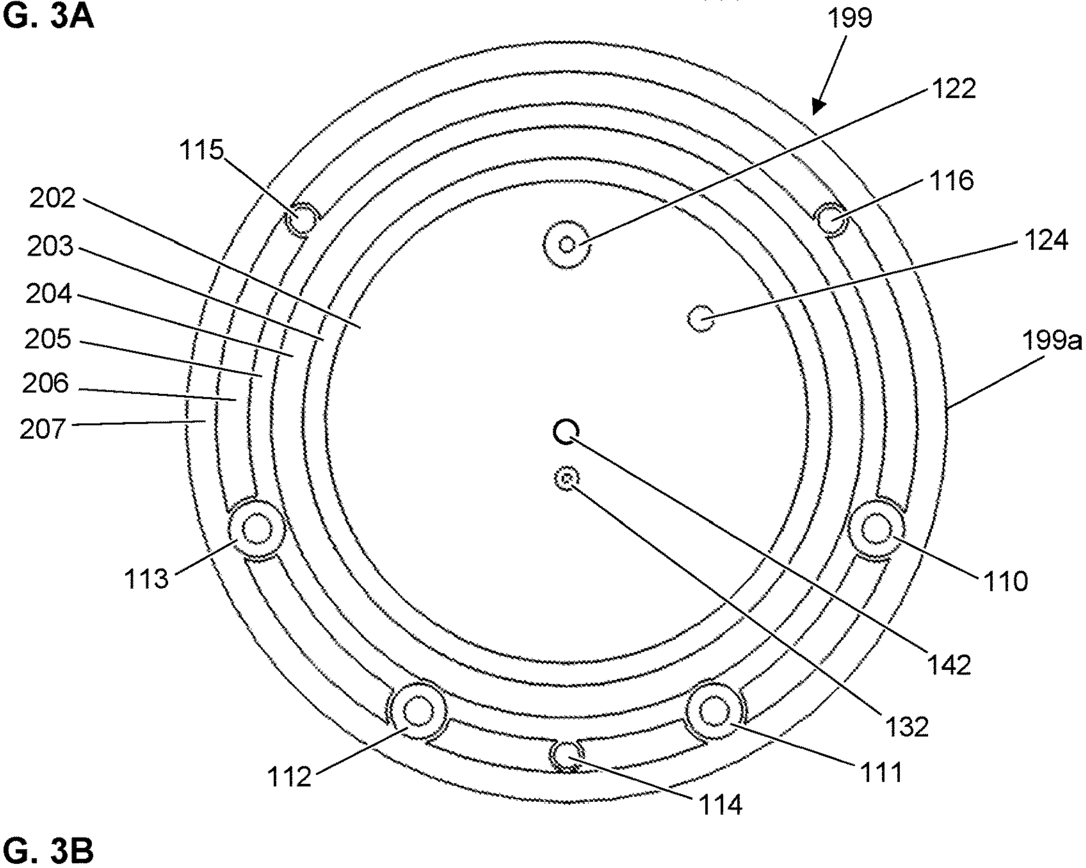
FIG. 3B illustrate a back side view of the corrugated ground plane antenna shown in FIG. 1, in accordance with at least one configuration disclosed herein.

FIG. 3B shows a bottom-view schematic illustration of the PCGPCA 100 with several additional features identified that were not visible from other views described herein. The bottom of the corrugated ground plane 199 is seen starting with the first trench floor 202, which in this configuration encompasses the entire center circular region of the corrugated ground plane 199. Radially concentric with this first trench floor 202 is the first rise underside 203, then second trench floor 204, then second rise underside 205, third trench floor 206, and finally third rise underside 207 to the outer rim.

The mounting features of FIG. 3A are seen replicated and mirrored in FIG. 3B as appropriate for the reverse angle. The threaded holes are readily seen arrayed, starting with the first threaded hole 110, and continuing around clockwise with the second threaded hole 111, third threaded hole 112, and fourth threaded hole 113. Similarly, the three (3) widely spaced non-threaded mounting holes are visible, including the first mounting hole 114, second mounting hole 115, and third mounting hole 116 also in a mirrored fashion as presented in the plan-view of FIG. 3A. A fourth mounting hole is additionally visible in FIG. 3B, which is the frame contact hole 142 used for mechanically and electrically connecting the antenna frame contact 141 to the central ground plane region 101. Note that in at least one configuration, the frame contact hole 142 is not axially centered with the helical radiating elements but is centrally located with respect to the frame contact 141 not visible in this view. It is contemplated that in other configurations, at least one frame contact hole 142 may be axially or symmetrically centered relative to one or more radiating elements.

The first and second axial helical radiating elements 120, 130 are interfaced from this bottom side of the corrugated ground plane 199 as well, with the first axial helical interface 122 and second axial helical interface 132 mechanically and electrically coupled through the central ground plane region 101 to the first axial helical input 121 and second axial helical input 131, respectively. The engagement feature of the first tuning element 123 is now visible as the first tuning interface 124. This is shown as a screw threaded feature and set to the tuning height as specified by an antenna designer.

Figure 4:
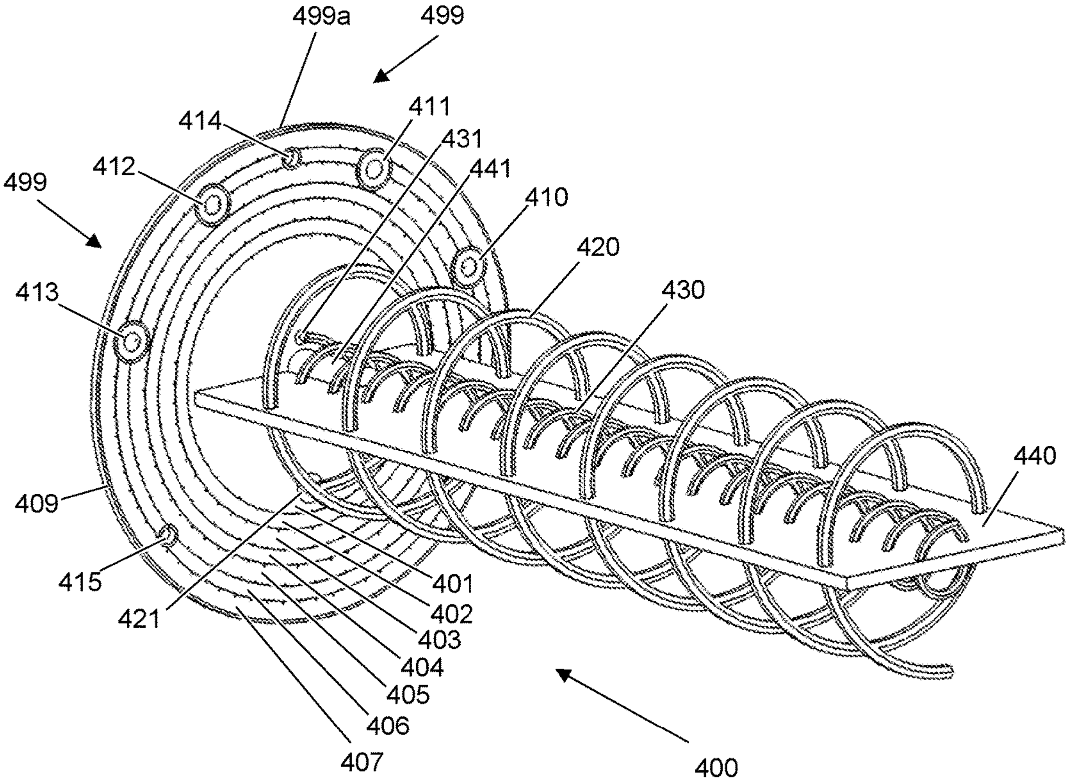
FIG. 4 illustrates an isometric front side view of another example corrugated ground plane antenna, in accordance with at least one configuration disclosed herein.

Referring now to FIG. 4, at least one configuration is disclosed that includes another apparatus, such as an electrically corrugated ground plane coaxial antenna (ECGPCA) 400, a front isometric view of which is illustrated as including a first axial helical radiating element 420 physically connected to a central ground plane region 401 of an electrically corrugated ground plane 499 at a first axial helical input 421. In addition, the ECGPCA 400 incorporates a second axial helical radiating element 430 physically connected to the central ground plane region 401 at a second axial helical input 431. The first and second axial helical radiating elements 420, 430 are physically positioned approximately along the same axis extending from and normal to the center of the central ground plane region 401 and are constrained by an antenna frame 440, which is itself physically connected to the central ground plane region 401 by a frame interface 441. The ECGPCA 400 includes the functionality described above for the PCGPCA 100 for similarly described features, but including the features described below that differentiate the two antennas.

The corrugated nature of the corrugated ground plane 499 is electrically manifested in a concentric manner around the central ground plane region 401 through a series of top-to-bottom transitions between conductive regions configured on the top side to conductive regions configured on the bottom side of a dielectric substrate 409. In at least one configuration, the dielectric substrate 409 is a PCB, with radial path segments discussed below being conductive materials (e.g., at least one of copper, silver, aluminum, nickel, gold, an alloy of at least one of copper, silver, aluminum, nickel, gold, and a solder compatible with at least one of copper, silver, aluminum, nickel, and gold) formed on the PCB. The top-side visible features visible in FIG. 4 to enable this electrical corrugation include subsections of the dielectric substrate 409 that are all mechanically connected together as a monolithic material. Mechanically connected to the central ground plane region 401 proximate to its radial extents is a first dielectric gap 402 projecting a short distance in the radial direction. The dielectric gap distance in the radial direction in the example of FIG. 4 is 0.1" before the electrical corrugation electrically rises back to a conducting surface shown to be essentially in plane with the central ground plane region 401. This conducting surface is a second radial path segment 403 mechanically connected to the first dielectric gap 402 along its outer circumference. The second radial path segment 403 surface is in a toroidal structure with a radial width of 0.14". In the interest is of clarity of nomenclature, it should be noted that the "first" radial path segment was not skipped in this detailed description, but rather it is not visible in this isometric top view and will be instead addressed in the detailed description of FIG. 5 below.

The pattern of dielectric gaps continues across the top surface of the electrically corrugated ground plane 499 with a third dielectric gap 404 connected to the second radial path segment 403 with similar geometry as the first dielectric gap 402. Following is a fourth radial path segment 405 connected to the third dielectric gap 404, also with similar radial geometry as the second radial path segment 403 except for its larger radii. Continuing the pattern is a fifth dielectric gap 406 connected to the fourth radial path segment 405, and a sixth radial path segment 407 completing the pattern, both features having similar geometries in the radial dimension as previous equivalent features, but with monotonically increasing radii of curvature to form a pattern of rings mechanically connected through the gap dielectric features.

In at least one configuration, the ECGPA 400 can include one or more mounting holes for attachment to other objects in a radio frequency system. The ECGPCA 400 of FIG. 4 is configured with a first nut insert 410 outfitted with screw threads appropriate for attachment of threaded hardware including screws having a 4-40 diameter and thread pitch. The first nut insert 410 is mechanically but not electrically connected to the corrugated features including the fourth radial path segment 405, fifth dielectric gap 406, and sixth radial path segment 407. Three (3) additional threaded holes are also present in the ECGPCA 400 including the second nut insert 411, the third nut insert 412, and the fourth nut insert 413. Each of these additional nut inserts is configured in a similar manner as the first nut insert 410 and arranged in an angular rotated manner about the mutual central axis of the coaxial first and second axial helical radiating elements 420 and 430.

Additional mounting holes are provided for in the ECGPCA 400 that are not threaded. A first through-hole 414 and a second through-hole 415 are positioned near a structure of the outer edge 499*a* of the electrically corrugated ground plane 499 in a similar manner as the nut inserts but physically separated from the nut inserts to provide space for hardware fasteners neither shown nor further discussed. In at least one configuration, the through-holes are conductive, and in at least one other configuration, the through-holes are isolated from the corrugated ground plane 199, such as by a dielectric (not shown). In at least one configuration, the through-holes are plated through-holes fabricated as part of a PCB manufacturing process. The through-holes can be configured to contain mechanical features or inserts for ease of mounting with threaded fasteners such as screws and nuts.

Although six (6) total threaded and unthreaded mounting holes are illustrated in FIG. 4, the number of mounting holes through the ECGPCA 400 can be more or less, dependent upon a particular mounting configuration. Moreover, in at least one other configuration other mounting configuration can be used with the ECGPCA 100, including the use of one or more mounting brackets (not shown) without degrading the content of the presently disclosed subject matter.

In a similar manner as that described for radio waves emanating from the PCGPCA 100, radio waves emanate from the ECGPCA 400 in an axial end-fire manner from the first and second axial helical radiating elements 420, 430 and the corrugated ground plane 499, as well in a normal vector away from the electrically corrugated ground plane 499. Also in a similar manner, in at least one configuration, the electrically corrugated ground plane 499 is circular. However, the corrugated ground plane 499 can be other shapes including square, rectangular, pentagonal, hexagonal, ovoid, or any other shape that establishes standing waves of radio-frequency currents. Non-circular shapes impact the polarization, frequency response, and beam lobe aim for any ECGPCA 400 design.

It is important to note that the physical geometry is only one factor in determining the nature of corrugations in an ECGPCA 400, as it is the arrangement of dielectric gaps and transitions from top-side radial path segments to bottom-side radial path segments that matters more than the mechanical shape. For example, in at least one configuration, a star-shaped polygonal shape of dielectric gaps configured inside a circular physical shape would result in antenna patterns and frequency sensitivity appropriate for a star-shaped corrugation pattern, not a circular one.

In at least one configuration, the corrugated ground plane 499, of the ECGPCA 400, has 1.65" in circular radius with a front-to-back conductor separation of 0.06". This size supports beneficial standing waves for frequencies between 2400 and 2483.5 MHz as well as frequencies between 5150 and 5850 MHz that constructively interfere with radiated emissions from the first and second axial helix radiating elements 420, 430. However, a plane geometry of the electrically corrugated ground plane 499 can support other overall physical and electrical sizes, as well as greater or fewer corrugation transitions to support standing waves of radio-frequency currents of other frequencies.

In at least one configuration, the ECGPCA 400 further includes the dielectric substrate 409. In at least one configuration, the dielectric substrate 409 can be 60-mil thick FR-4 epoxy glass fiber material having copper foil cladding. As known to those skilled in the art of printed circuit board design, however, a wide variety of materials may be used for the dielectric substrate 409 without departing from the scope of the features disclosed herein, including, but not limited to, other thicknesses and layer structures of FR-4 and its numerous variants from many vendors, higher-quality esoteric materials such as Rogers RT/duroid 5880, other low-dielectric materials commonly used for antenna structures, and many others used across the RF and wireless electronics industry.

In at least one configuration, the ECGPCA 400 can utilize only two conductor layers on the dielectric substrate 409, such as a first side and a second side of a printed circuit board with vias that electrically and mechanically connect between the conductor features located on each of the two sides. This configuration for the ECGPCA 400 provides for a very low-cost antenna design that can readily be scaled to high-volume manufacturing by numerous domestic and overseas PCB fabrication service providers. In at least one configuration, the electrically conductive layers can be formed from at least one of copper, silver, aluminum, nickel, gold, their alloys, and their solders, or any other electrically conductive material from which antennas can be formed.

In at least one configuration, the antenna frame 440 can be 60-mil thick Shengyi S1190M material having a dielectric constant of approximately 4.4 at the frequencies described herein. In at least one configuration, the antenna frame 440 has no metal layers and no vias, providing for a very low-cost design that can readily be scaled to high-volume manufacturing by numerous domestic and overseas PCB fabricators.

Figure 5:
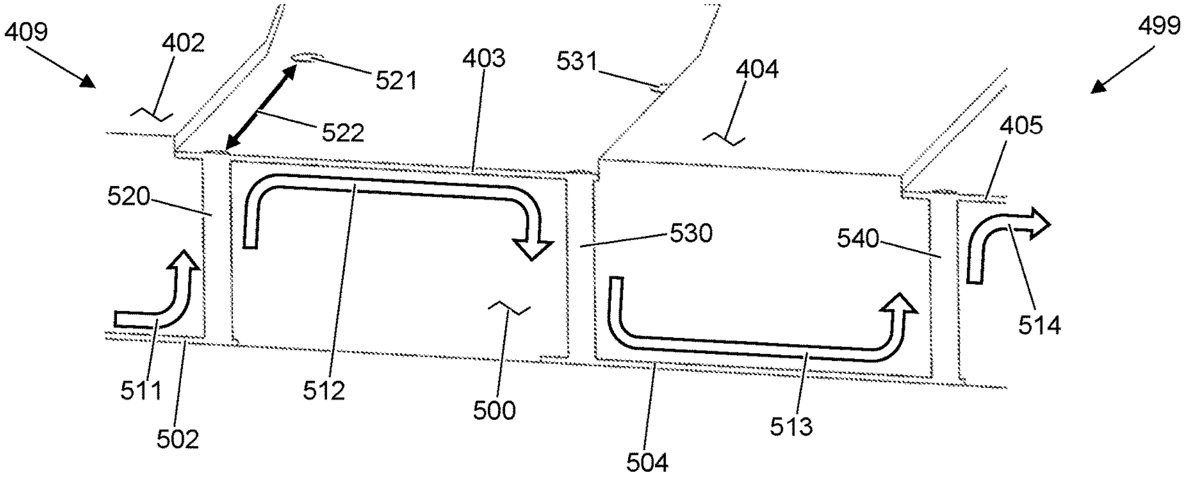
FIG. 5 illustrates a cross-sectional schematic illustration of the corrugated ground plane of the corrugated ground plane antenna shown in FIG. 4, in accordance with at least one configuration disclosed herein.

A cross-section of the corrugated ground plane 499, of the ECGPCA 400, is shown in FIG. 5 to provide clarity on morphology and describe its function. Selected features are visible in the cross-section, starting with the description of a series of top-to-bottom transitions between conductive regions configured on the top side to conductive regions configured on the bottom side of the dielectric substrate 409. Part of the first dielectric gap 402 is seen on the left-hand side projecting a short distance in the radial direction. At the bottom surface of the ECGPCA 400, below the first dielectric gap 402, is a first radial path segment 502. A radio-frequency current has a first current segment 511 along this first radial path segment 502 and transitioning up a first via 520 shown in cross-section. The first via 520 electrically and mechanically couples the first radial path segment 502 to a second current segment 403 positioned at the top of the dielectric bulk 500.

In at least one configuration, sizing of the vias can range between 0.001" and 0.25", which can be suitable for one or more configurations, depending on the frequency of operation and the materials and fabrication techniques employed in its construction. In at least one configuration, the vias are arranged in a circumferential array as intimated in FIG. 4 and explicitly visible in the magnified cross-section of FIG. 5. For example, a second via 521 is seen located proximate to the inner circumferential curve of the second current segment 403. The second via 521 is spaced a via pitch 522 away from the first via 520. In at least one configuration, the via pitch 522 is 0.060". Such a spacing is electrically appropriate for the routing of RF signals at or below the 6 GHz frequency range and is simple to fabricate. As known to those skilled in the art of printed circuit board design, however, a wide variety of via spacings may be used without departing from the scope of the features disclosed herein.

In at least one configuration, plated through vias are used for all electrical connections between radial path segments. It is envisioned that in other configurations, a combination of plated through vias and electrical components may be used for one or more electrical connections between radial path segments. In one or more of such configurations, these electrical components may present frequency-varying performance characteristics to establish filtering characteristics for one or more electrical connections.

The second radial path segment 403 surface extends across the top surface of the dielectric bulk 500 to a second set of vias that are electrically and mechanically connected. For example, this second set of vias includes a third via 530 and a fourth via 531, both of whom extend the electrical and mechanical coupling down through the dielectric bulk to a third radial path segment 504. The second current segment 512 travels across this second radial path segment 403 and down the third via 530 towards the third radial path segment 504.

The pattern of transitions between top conducting radial path segments and bottom conducting radial path segments continues along the electrically corrugated ground plane 499 with the third radial path segment 504 physically positioned below the third dielectric gap 404 and connected to a fifth via 540. The fifth via 540 then electrically and mechanically couples to a fourth radial path segment 405. The current segments continue along this path, with a third current segment 513 traveling across the third radial path segment up through the fifth via 540, whereupon the fourth current segment 514 continues across the fourth radial path segment 405. This pattern continues until the current segments encounter the outer rim of the corrugated ground plane 499 and reflect to establish their standing waves (for frequencies of designed operation).

In at least one configuration, frequencies of radio frequency energy outside of the designed bands of operation reflect as traveling waves which interact with incoming waves in a destructive or non-ideal manner with respect to its propensity to radiate in a normal direction from an upper surface of the corrugated ground plane 499.

In at least one configuration, each current segment is 0.0014" thick representing the weight of 1 oz. of copper per full square foot, a standard copper thickness for printed circuit boards. In at least one configuration, the vias 520-540 are 0.010" in diameter, a common size for through-plated vias. Other thicknesses may also be used subject to the constraints of the fabrication technique, material, and frequency of design. It is considered by those skilled in the art of radio frequency component design that the substrate thickness, via diameter, and thickness of each floor and rise ceiling may be configured to be less than $1/10^{th}$ the wavelength of the highest frequency of operation of the ECGPCA 400 so as to minimize the effect of these discontinuities on the traveling wave. In yet other configurations, one or more of the material thicknesses, via diameters, and radial path segment dimensions are designed as quarter-wavelengths of, or harmonic thereof, at one or more frequencies of operation for the ECGPCA 400.

When considering the total path length that supports the traveling current, the total path length up and down the vias 520-540 gets counted in the distance, as does the lateral planar distance to travel into and out of each via constriction. This will be true so long as the distances are small compared to the wavelength of the signal. In at least one configuration, the signal travels through six additional sidewalls above and beyond the planar lateral distance traveled along the trench floors and riser ceilings. With each of the vias 520-540 being 0.06" in height, the total distance traveled is at least 0.36" longer than the travel length of a typical non-corrugated ground plane of equivalent radius. To achieve a similar performance as the ECGPCA 400, a typical non-corrugated ground plane antenna would have to have a radius at least 0.36" larger and take require additional area for mounting. Such an antenna would be larger and weigh more than an ECGPCA 400 of equivalent performance and require larger mounting structures and stronger resistance to aerodynamic and/or hydrodynamic forces depending on its deployment.

Figure 6A:
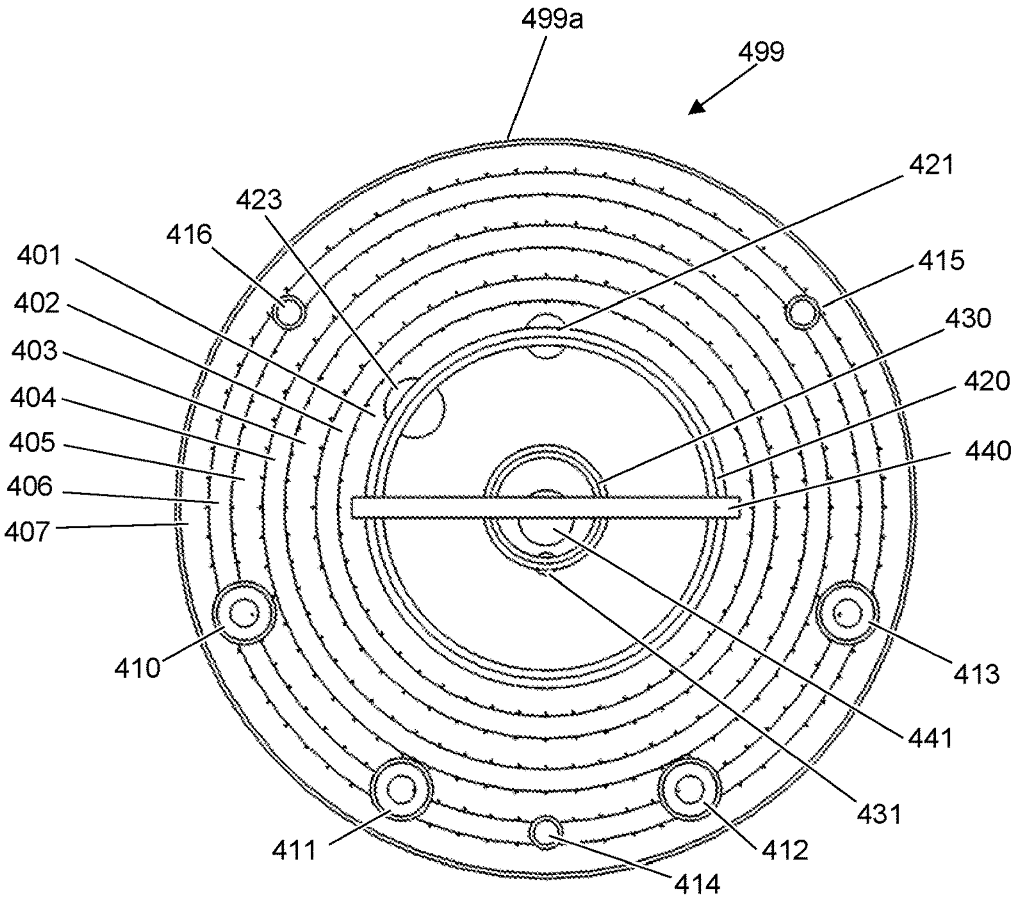
FIG. 6A illustrates a front side view of the corrugated ground plane antenna shown in FIG. 4, in accordance with at least one configuration disclosed herein.

The radial orientation of the features of an ECGPCA 400 is seen clearly in the plan-view schematic illustration of FIG. 6A. The central ground plane region 401 is seen to be oriented about a common center axis shared with the first axial helical radiating element 420, second axial helical radiating element 430, and antenna frame 440. The radial path segments and dielectric gaps surround the central ground plane region 401 in an annular concentric fashion. The first dielectric gap 402 is seen to be first adjacent to the central ground plane region 401 and is itself surrounded by the second radial path segment 403, third dielectric gap 404, fourth radial path segment 405, fifth dielectric gap 506, and sixth radial path segment 407 to the outer rim of a structure of the corrugated ground plane 499. Geometries and dimensions are as previously detailed, with concentric nature clarified in FIG. 6A.

The mounting hole configurations are also clarified in FIG. 6A, showing four (4) threaded nut inserts in this view for at least one configuration of ECGPCA 400. A first nut insert 410, second nut insert 411, third nut insert 412, and fourth nut insert 413 are seen to be arrayed in an angular fashion near the outer rim of a structure of the corrugated ground plane 499. In at least one configuration, the threaded inserts span multiple radial path segments in their radial distance, so are electrically isolated from all radial path segments so as not to provide shortened paths for traveling waves. In at least one alternative configuration, the threaded inserts are electrically connected across one or more radial path segments in its radial distance. Accommodating structures with electrical corrugations, conducting and/or non-conducting through-holes, and dielectric isolation gaps and mechanical features are tasks known to those skilled in the art of radio frequency component design.

FIG. 6A also shows three (3) visible non-threaded mounting holes in this view of the corrugated ground plane 499, for at least one configuration of ECGPCA 400. A first through-hole 414, second through-hole 115, and third through-hole 116 are arranged about the central axis and provide non-threaded mounting options. Similar constraints on current path interaction are present with non-threaded mounting holes as with threaded mounting holes.

The connection of the first and second axial helical radiating elements 420, 430 in FIG. 6A is arranged in a similar fashion throughout the central ground plane region 401. The first axial helical radiating element 420 is connected to a first axial helical input 421, the second axial helical radiating element 430 is connected to a second axial helical input 431, each partially obstructed in plain view by their own windings. In at least one configuration, the two inputs are separated by a distance that is close to a half wavelength for the lower of the two frequencies of operation, and also close to one and a half wavelengths for the higher of the two frequencies of operation. In this manner, a high-impedance condition is provided between the two ports for the frequency not used by that port and overall isolation between the ports is high.

In at least one configuration, the mechanical and electrical connection of antenna elements are performed throughout the non-corrugated central ground plane region 401. It is contemplated that in other configurations, the mechanical and electrical connection of one or more antenna elements can be performed in regions that include one or more electrically corrugated radial path segments. In at least one of these configurations, the current path is designed to match one frequency for standing waves but not match other non-harmonic frequencies. In at least one of these configurations, the current path is designed to add electrical length between the two input ports to better match the preferred length for isolation of the higher and lower frequencies between the lower and higher frequency antenna ports, respectively.

Between the first axial helical input 421 and second axial helical input 431 is a frame interface 441 attaching the antenna frame 440 to the central ground plane region 401. The frame interface 441 further provides capacitance to the corrugated ground plane 499 for the second axial helical input 431 and second axial helical radiating element 430. The first helix antenna 420 has a separate first tuning trap 423 located approximately 50 degrees counter-clockwise along the curved path of the first helix antenna 420 coil that similarly increases capacitance to ground at that phase delay from the first axial helical input 421.

Figure 6B:
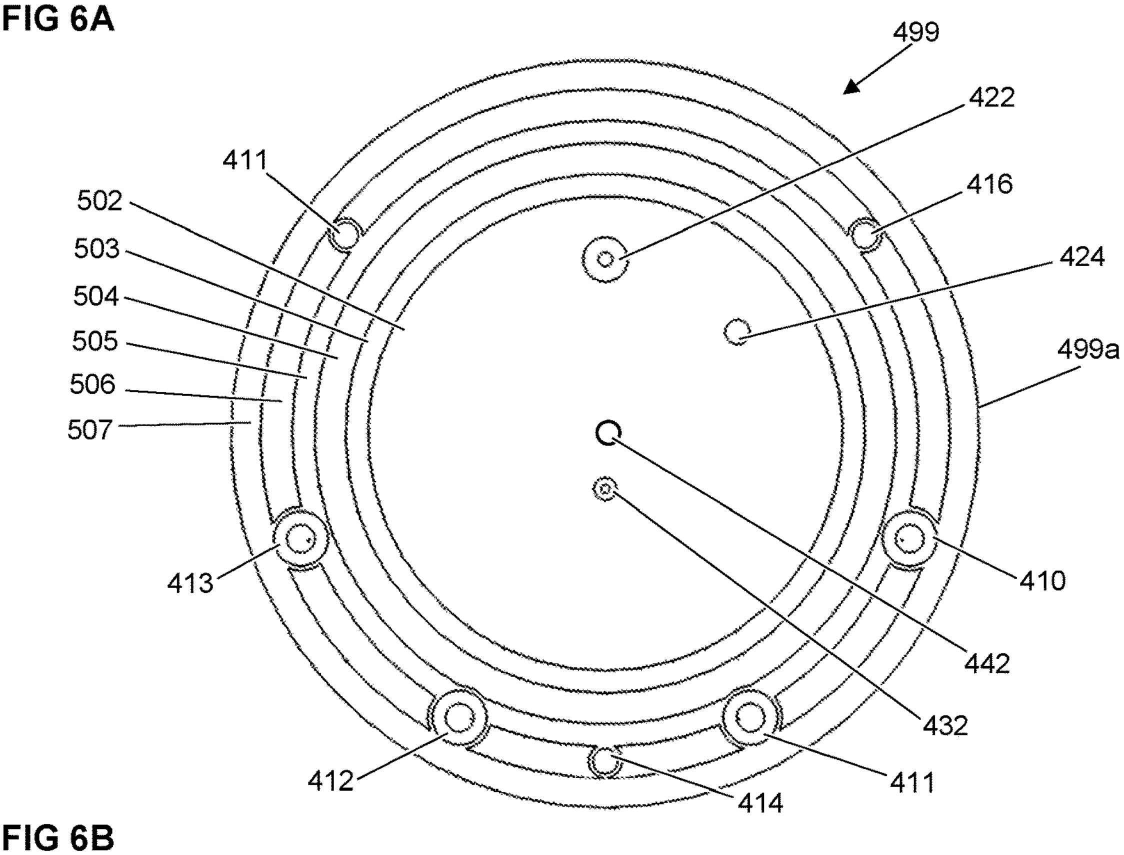
FIG. 6B illustrates a back side view of the corrugated ground plane antenna shown in FIG. 4, in accordance with at least one configuration disclosed herein.

FIG. 6B is a bottom-view schematic illustration of the ECGPCA 400 with several additional features not visible from other views. The bottom of the electrically corrugated ground plane 499 is seen starting with the first radial path segment 502, which in at least one configuration encompasses the entire center circular region of the corrugated ground plane 499. In at least one other configuration the first radial path segment 502 is physically comprised to be an annular ring of a limited radial width which may be of similar dimension to other radial path segment widths. Radially concentric with this first radial path segment 502 is the second dielectric gap 503, then third radial path segment 504, then fourth dielectric gap 505, fifth radial path segment 506, and finally a sixth dielectric gap 507 to the outer edge 499*a*.

The mounting features of FIG. 6A are seen replicated and mirrored in FIG. 6B as appropriate for the view. The nut inserts are readily seen arrayed, starting with the first nut insert 410, and continuing around clockwise with the second nut insert 411, third nut insert 412, and fourth nut insert 413. Similarly, the three (3) widely spaced non-threaded through-holes are visible, including the first through-hole 414, second through-hole 415, and third through-hole 416. A fourth mounting hole is additionally visible in FIG. 6B, which is the frame through-hole 442 used for mechanically and electrically connecting the antenna frame interface 441 to the central ground plane region 401. Note that in at least one configuration, the frame through-hole 442 is not axially centered with the helix antennas but is centrally located with respect to the frame interface 441 not visible in this view. It is contemplated that in other configurations, at least one frame through-hole 442 may be axially or symmetrically centered relative to one or more antennas.

The first and second axial helical radiating element 420, 430 are interfaced from the bottom, with the first axial helix interface 422 and second axial helix interface 432 mechanically and electrically coupled through features of the ground plane 499 and dielectric substrate 409 to the first axial helical input 421 and second axial helical input 431, respectively. The engagement feature of the first tuning trap 423 is now visible as the tuning trap interface 424. This is shown as a screw threaded feature and set to the tuning height required by the antenna designer.

In at least one configuration, the ECGPCA 400 can further include an antenna matching circuit as part of each of the first axial helix interface 422 and second axial helix interface 432. In at least one configuration, one or more matching circuits is comprised of a transmission line circuit comprising lengths of circuit traces that have varying length and impedance. In at least one configuration, one or more matching circuits is comprised of a lumped element circuit comprising components having different capacitance and inductance values as known and used by those skilled in the art of RF electronics design.

In at least one configuration, the ECGPCA 400 can further include an RF connector as part of each of the first axial helix interface 422 and second axial helix interface 432. In at least one configuration, the RF connector is a Sub-Miniature Push-on (SMP) through-hole connector with a detent for RF cable or plug adapter retention, such as the SMP-PF-P-HG-ST-TH2 from Samtec. In at least one other configuration, at least one of a variety of similar RF connectors can be used from a wide variety of subminiature, miniature, or standard size RF connection lines including, but not limited to, SMA, MMCX, SMPM, and others known and used by those skilled in the art of RF electronics design and/or testing. In at least one configuration, a directly soldered cable end (e.g., “pigtail” to those skilled in the art) can similarly be used to save on component cost at the expense of increased assembly labor.

Figure 7A:
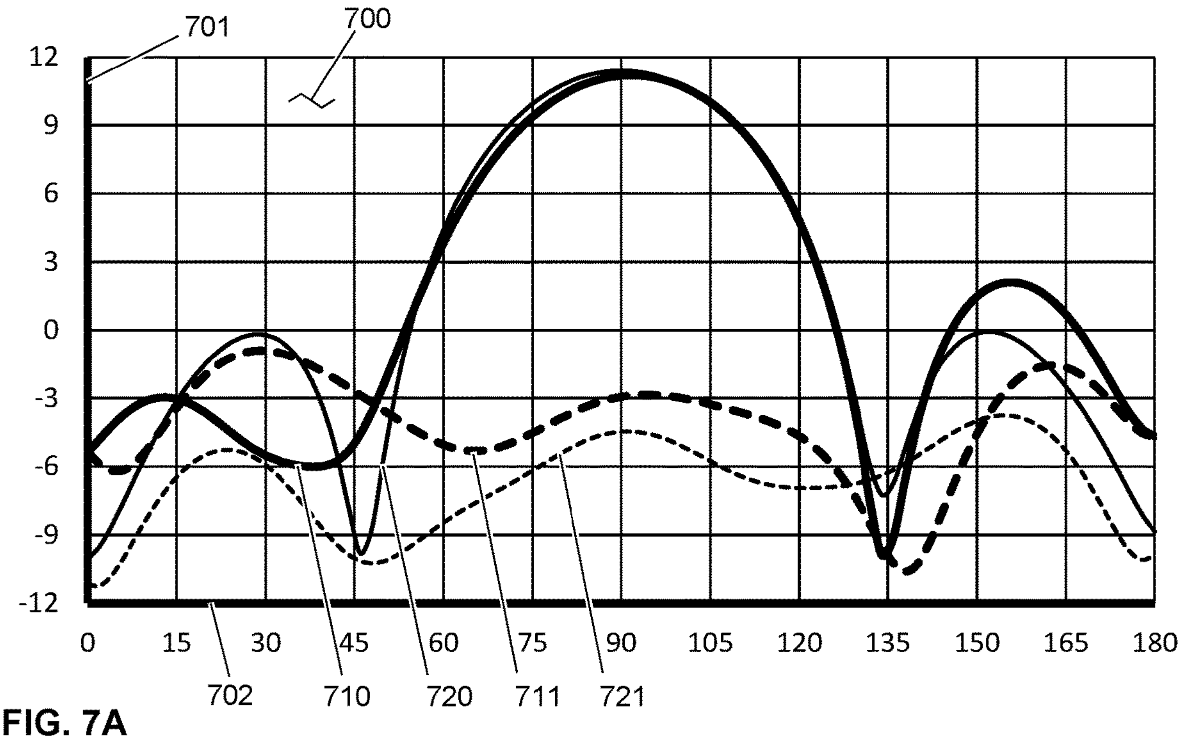
FIG. 7A illustrates a graph of example realized total gain for the lower frequency of the corrugated ground plane antenna shown in FIG. 4 as compared to a larger conventional coaxial helical antenna of similar performance, in accordance with at least one configuration disclosed herein.

The total realized antenna gain of an ECGPCA 400 is illustrated in the 2440 MHz gain graph 700 of FIG. 7A and a comparison is made to a typical coaxial helical antenna of a substantially larger size of typical ground plane. In the graph, the 2440 MHz gain axis 701 shows the gain value in decibels (dBi), a figure of merit known to those skilled in the art of antenna design. The 2440 MHz azimuth axis 702 shows the angle in degrees of the radiation pattern, with 90 degrees representing boresight as normal to the corrugated ground plane 499 and coincident with the axis shared by the first and second axial helical radiating elements 420, 430. An angle of 0 degrees represents aim to the left, and an angle of 180 degrees represents aim to the right.

A single configuration of the ECGPCA 400 as described by FIGS. 4, 5, 6A, and 6B having an electrically corrugated ground plane of physical diameter 3.65" has an ECGPCA 400 with a 2440 MHz gain 710 as a solid bold line. The backwards-directed radiation pattern of the antenna is provided as an ECGPCA 400 with a 2440 MHz back-gain 711 as a dashed bold line. The gain at forward broadside at this frequency is seen to be approximately +11 dBi.

Also presented in the 2440 MHz gain graph 700 is the realized gain for a Normal Ground Plain Coaxial Antenna (NGPCA) (not shown) from a highly-regarded vendor designed in a typical manner without use of the presently disclosed features. The NGPCA has a conventionally designed ground plane with a 4.16" diameter, about 59% more area than the ECGPCA 400. The forward gain is provided as NGPCA 2440 MHz gain 720 as a solid thin line. The backwards directed radiation pattern is provided as NGPCA 2440 MHz back-gain 721. The forward gain at this frequency is seen to be approximately +11 dBi, almost exactly the same radiation characteristics as the ECGPCA 400. The backwards reflection is seen to be similar as well, only a few dB different, with the ECGPCA 400 slightly over-performing the NGPCA.

Figure 7B:
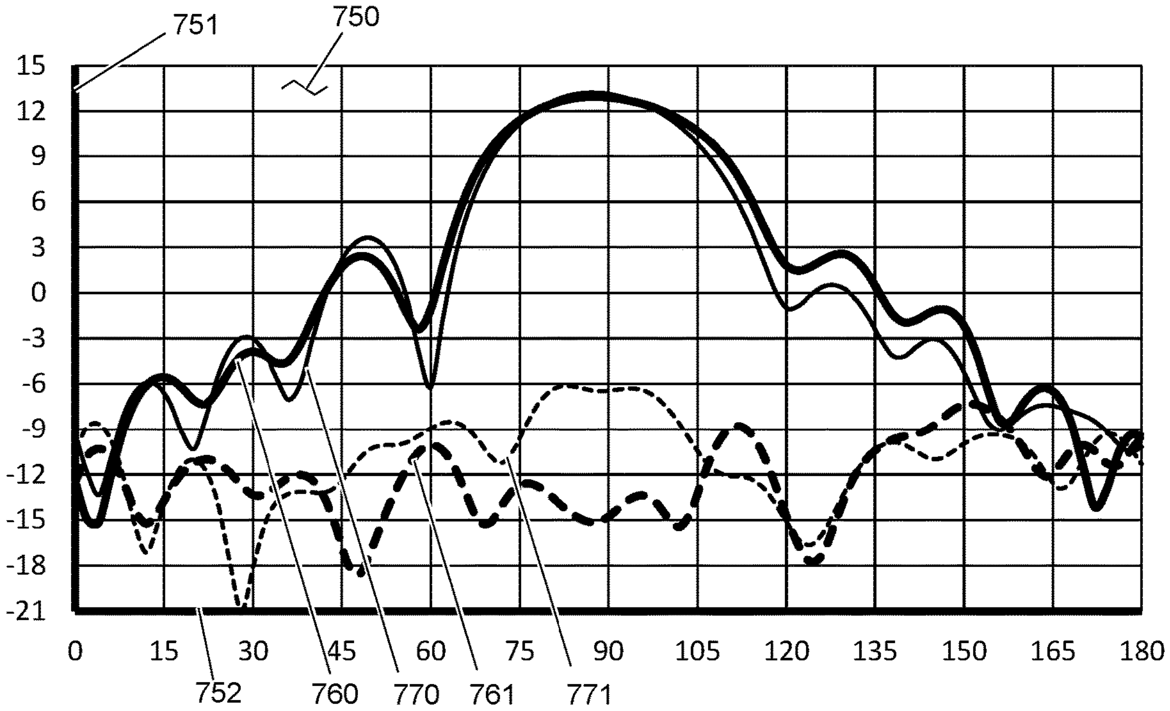
FIG. 7B illustrates a graph of example realized total gain for the upper frequency of the corrugated ground plane antenna shown in FIG. 4 as compared to a larger conventional coaxial helical antenna of similar performance, in accordance with at least one configuration disclosed herein.

The performance of the ECGPCA 400 and NGPCA at the higher frequency of operation is provided in FIG. 7B in the 5800 MHz gain graph 750. In the graph, the 5800 MHz gain axis 751 shows the gain value in decibels and the 5800 MHz azimuth axis 752 shows the angle in degrees of the radiation pattern, with 90 degrees representing boresight in the same manner as seen in FIG. 7A.

The forward gain of the ECGPCA 400 is provided as a bold line shown as the solid bold line of ECGPCA 400 with a 5800 MHz gain 760. The backwards-directed radiation pattern is provided as ECGPCA 400 with a 5800 MHz back-gain 761 shown as a dashed bold line. The gain at forward broadside at this frequency is seen to be approximately +13 dBi.

The forward gain of the typically-designed antenna at the higher frequency of operation is provided as NGPCA 400 with a 5800 MHz gain 770 shown as a solid thin line. The backwards directed radiation pattern is provided as NGPCA 400 with a 5800 MHz back-gain 771. The forward gain at this frequency is seen to be approximately +13 dBi, again almost exactly the same radiation characteristics as the ECGPCA 400. The backwards reflection is seen to be similar as well, only a few dB different, again with the ECGPCA 400 slightly over-performing the NGPCA.

Based on the comparison of the performance data of FIGS. 7A and 7B, it is readily seen that the overall performance of the ECGPCA 400 is similar to, if not slightly superior to, the performance of the NGPCA despite the significantly smaller area of its ground plane. In at least one configuration, the ECGPCA 400 has a calculated ground plane area of only 63% of the NGPCA, and the total weight is only 85% that of the NGPCA.

Figure 8A:
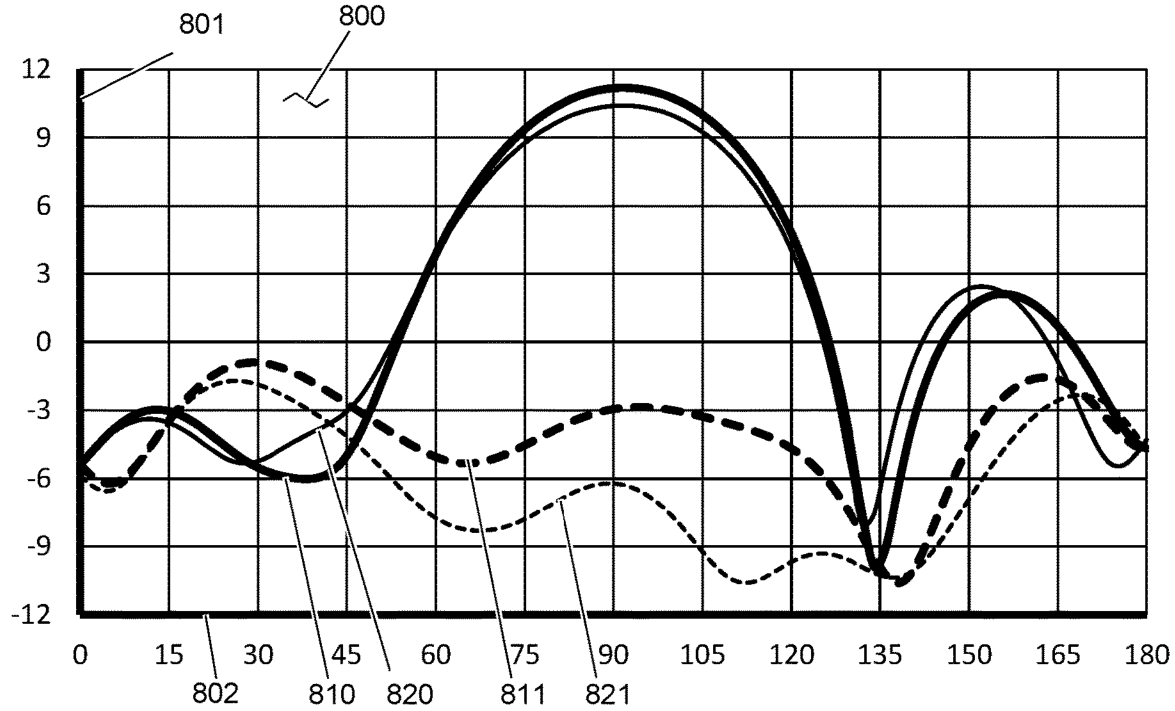
FIG. 8A illustrates a graph of the same realized total gain for the lower frequency of the corrugated ground plane antenna shown in FIG. 4 as compared to a conventional coaxial helical antenna of similar size, in accordance with at least one configuration disclosed herein.
Figure 8B:
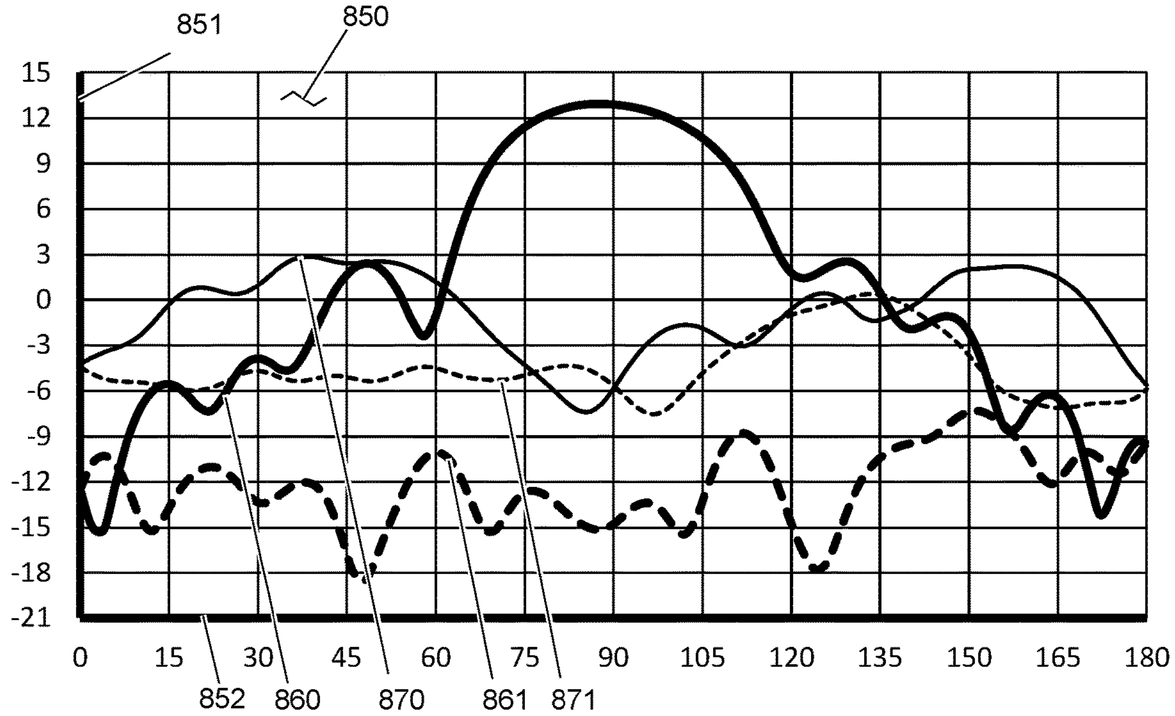
FIG. 8B illustrates a graph of the same realized total gain for the upper frequency of the corrugated ground plane antenna shown in FIG. 4 as compared to a conventional coaxial helical antenna of similar size, in accordance with at least one configuration disclosed herein.

A ready comparison is further made regarding substantially higher performance than typical helical antennas given a similar size and weight. FIGS. 8A and 8B show realized gain graphs of the same implementation of the presently disclosed ECGPCA 400 compared to the data for a typical Reduced Ground Plane Coaxial Antenna RGPCA without use of the presently disclosed features. This comparison is to prove the point that a compact design without use of the presently disclosed features will fail to achieve the same desired performance.

The performance of the ECGPCA 400 and RGPCA at the lower frequency of operation is provided in FIG. 8A in the 2440 MHz gain chart 800. In the chart, the 2440 MHz gain axis 801 shows the gain value in decibels and the 2440 MHz azimuth axis 802 shows the angle in degrees of the radiation pattern, with 90 degrees representing boresight in the same manner as seen in FIG. 7A.

The forward gain of the ECGPCA 400 is provided as the solid bold line of ECGPCA 400 with a 2440 MHz data 810. The backwards-directed radiation pattern is provided as ECGPCA 400 with a 2440 MHz back-data 811 shown as a dashed bold line. The gain at forward broadside at this frequency is seen to be approximately +11 dBi as before.

The forward gain of the reduced-size normal antenna at the lower frequency of operation is provided as RGPCA 2440 MHz data 820 shown as a solid thin line. The backwards directed radiation pattern is provided as RGPCA 5800 MHz back-data 821. The forward gain at this frequency is seen to be approximately +10 dBi, slightly worse radiation characteristics as the ECGPCA 400. The backwards reflection is seen to be similar as well, only a few dB different, except in this case with the RGPCA slightly out-performing the ECGPCA 400 in the reverse direction.

The performance of the ECGPCA 400 and RGPCA at the higher frequency of operation is provided in FIG. 8B in the 5800 MHz gain chart 800. In the chart, the 5800 MHz gain axis 851 shows the gain value in decibels and the 5800 MHz azimuth axis 852 shows the angle in degrees of the radiation pattern. The forward gain of the ECGPCA is provided as the solid bold line of ECGPCA 400 with a 5800 MHz data 810. The backwards-directed radiation pattern is provided as ECGPCA 400 with a 5800 MHz back-data 811 shown as a dashed bold line. The gain at forward broadside is seen to be approximately +13 dBi as before.

The forward gain of the reduced-size normal antenna at the higher frequency of operation is provided as RGPCA 5800 MHz data 870 shown as a solid thin line. The backwards directed radiation pattern is provided as RGPCA 5800 MHz back-data 871. The forward gain at this frequency is seen to be approximately −6 dBi, a significantly worse radiation pattern, and not generally considered acceptable. The backwards reflection is seen to be similar as well, with the ECGPCA 400 out-performing by a few dB. It is clear that the reduced size ground plane antenna designed using normal techniques is unsuitable at this size range. In other configurations, sizes within 0.3" of this 1.65" nominal radius for a typical ground plane coaxial helix antenna still fail to achieve suitable performance characteristics for the upper frequency band, so the advantage of features of the ECGPCA 400 are clear.

Considering the above data comparisons, it is seen that at least one configuration of the presently described antenna having corrugated ground plane significantly outperforms typically-designed coaxial helical antennas at desirable commercial frequencies of comparable overall dimensions, or performs similarly to typically-designed coaxial helical antennas that are larger and heavier. In at least one configuration, an ECGPCA 400 has equivalent performance despite having only 63% of the original area of ground plane and 85% of the original weight of a conventionally designed coaxial helical antenna.

It is contemplated that antennas that employ the presently described feature(s) are particularly attractive for antenna arrays owing to their compact size and superior gain. These advantages are valuable for arrays consisting of a variety of antennas and bandwidths in proximity. Antennas in proximity are known to couple to each other, changing the input and radiating characteristics of one or both antennas dependent on their type, structure, and proximity. Electrically smaller antennas (smaller as compared to their wavelength of operation) are known to interact less with adjacent antennas. Electrically small antennas are intrinsically less prone to de-tuning (frequency shifting of resonance and/or operating frequency range) due to adjacent antennas.

Figure 9:
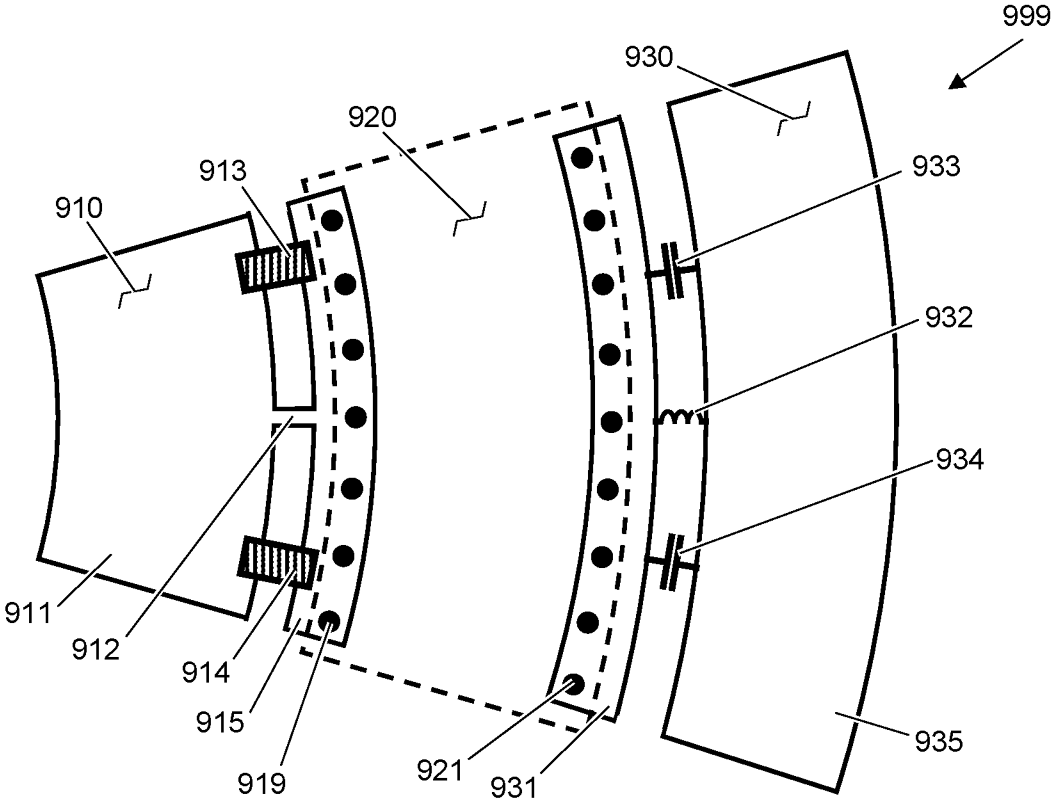
FIG. 9 illustrates a plan-view section of another example corrugated ground plane antenna, wherein circuit elements provide frequency-dependent electrically-equivalent path length variation, in accordance with at least one configuration disclosed herein.

Continuing the detailed description of electrically small features in certain configurations of the presently described subject matter, FIG. 9 illustrates a plan-view section of another example corrugated ground plane, such as corrugated ground plane 999. The corrugated ground plane 999 includes circuit elements that provide frequency-dependent electrically-equivalent path length variation. Such an arrangement presents filtering characteristics, wherein at least one configuration will filter one or more of the frequencies of operation to present a frequency-varying electrical length for currents traveling through the transitions from one radial path segment to a radial segment. The corrugated ground plane 999 can be used instead of the corrugated ground plane 199 and the corrugated ground plane 499, described above.

An angular section of a first radial path segment 910 is seen as including, such as to incorporate, a first radial path segment 911 coupled or connected to a second radial path segment 915 by a first radial connector 912. The first radial connector 912 is illustrated in a manner that reflects design of an inductive element at RF frequencies, in this case being 0.050" long and 0.010" wide, presenting approximately 1.5 nH of distributed inductance between the first radial path segment 911 and the second radial path segment 915. In addition to this inductance, passive radio-frequency circuitry, such as capacitors, e.g. surface-mounted chip-scale capacitors, can be used to couple the first radial path segment 911 and the second radial path segment 915. As shown, these capacitors can be arranged symmetrically on both sides of the first radial connector 912, designated as a first chip capacitor 913 and a second chip capacitor 914, although use of other types of capacitors are possible. The first and second chip capacitors 913, 914 can be positioned 0.25" away from the radial connector 912 in each angular direction clockwise and counter-clockwise from the first radial connector 912.

The combination of circuit elements, including the frequency-dependent phase delay based on physical position for currents traveling to the first and second chip capacitors 913, 914 instead of through the radial connector 912, which results in a higher electrically-equivalent length of travel (in terms of frequency-varying phase advancement for surface currents) between the first radial path segment 911 and the second radial path segment 915 for the 5800 MHz band than it does for the 2400 MHz band. This means a frequency-dependent non-linear phase advancement for the same physical length of travel that is different than the typical path-length linear variation.

The electrically equivalent path transition continues from the second radial path segment 915 through a first via array 919, illustrated as an arrayed series of black dots in FIG. 9 (individual vias are not separately identified for the sake of simplicity of discussion). The first via array 919 mechanically and electrically connects to another radial path segment, such as a third radial path segment 920 shown in dashed outline to signify it is positioned below a dielectric substrate in the same manner as the radial path segments detailed in FIGS. 4 through 6B. The simplicity of the third radial path segment 920 explicitly provides for an example of at least one configuration where there is no additional electrical circuitry configured on one of the two sides of the corrugated ground plane.

The electrically equivalent path continues through a second via array 921 to mechanically and electrically couple or connect the third radial path segment 920 to a fifth radial path segment 930 by way of an overlap launch region, such as a fourth radial path segment 931. The fourth radial path segment 931 is then connected to the delay path region 935 of the fifth radial path segment 930 by a schematically illustrated equivalent of an inductor and two capacitors in a manner known to those skilled in the art of electronic circuit design. This includes a second inductor 932 that provides a frequency-dependent lower-frequency connection between the fourth radial path segment 931 and the fifth radial path segment 930, while an angularly separated third capacitor 933 and a fourth capacitor 934 provide a high-frequency bypass between the fourth radial path segment 931 and the fifth radial path segment 930.

Figure 10:
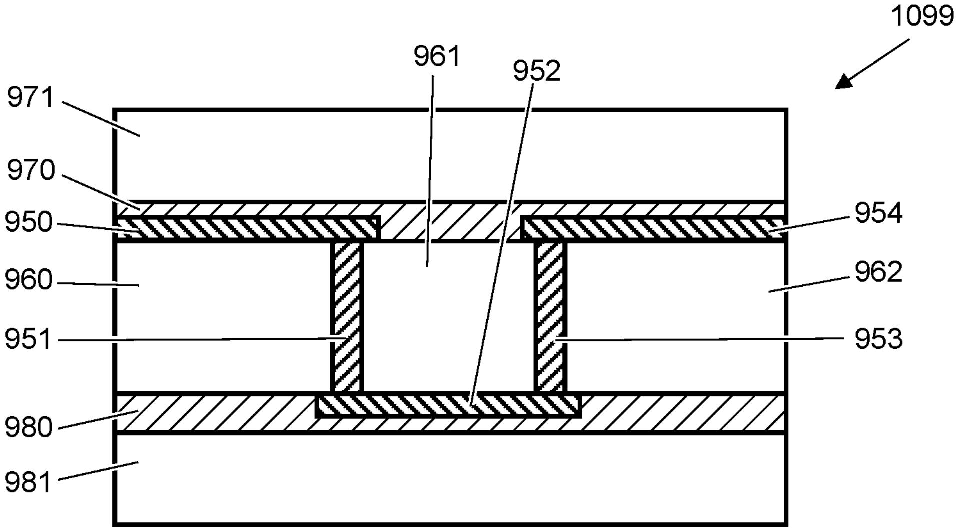
FIG. 10 illustrates a cross-section of yet another example corrugated ground plane antenna, wherein dielectric loading provides frequency-dependent electrically-equivalent path length increase, in accordance with at least one configuration disclosed herein.

Further continuing the detailed description of reducing physical size through frequency-varying electrical properties, FIG. 10 illustrates a cross-section of yet another example corrugated ground plane 1099, wherein dielectric loading provides frequency-dependent electrically-equivalent path length increase to reduce the effective wavelength of surface currents. The cross-section shown in FIG. 10 illustrates three radial path segments of the corrugated ground plane 1099 connected by vias that are sectioned. The first radial path segment 950 is coupled or connected to a second radial path segment 952 by a first via 951. The second radial path segment 952 is connected to a third radial path segment 954 by a second via 953. The first radial path segment 950 and third radial path segment 954 are positioned at or near top surfaces of a first dielectric region 960 and third dielectric region 962, respectively, while the second radial path segment 952 is positioned at or near a bottom surface of a second dielectric region 961 in a similar fashion as the cross sectional schematic illustrated in FIG. 5.

The first, second, and third radial path segments 950, 952, 954 are natively loaded by the presence of the first, second, and third dielectric regions 960, 961, and 962. In this context, as with the illustration of FIG. 5, loading refers to the shortening of the wavelength of the radio frequency current, making the physical path length appear to the current to be longer than it is with respect to the advancement of phase. This increased electrical path length is intrinsically frequency varying as the wavelength shortening is an effect that varies with frequency according to the nonlinearity of the dielectric constant.

The loading effect of at least one configuration illustrated in FIG. 10 is enhanced by the physical proximity of additional dielectric materials provided by the first, second, and third dielectric regions 960, 961, and 962. The top surface of the corrugation has a top adhesion layer 970 and a top loading layer 971, which shortens the wavelength of the currents traveling along the first radial path segment 950 and third radial path segment 954. The bottom surface of the corrugation has a bottom adhesion layer 980 and a bottom loading layer 981 which shortens the wavelength of the currents traveling along the second radial path segment 952.

It is evident that if the dielectric loading of the top and bottom radial path segments 950, 952, 954 increases the effective electrical length of the current waves, and therefore the corrugated ground plane 1099 that is so loaded can be physically smaller than a typical corrugated ground plane that is unloaded, while the corrugated ground plane 1099 provides an equivalent effective electrical length. The example of FIG. 10 is intended to be instructive as an example for further size reduction. A complete design of an electrically corrugated ground plane antenna with dielectric loading as shown by the corrugated ground plane 1099 is left as an exercise for those skilled in the art of radio frequency component design.

Figure 11:
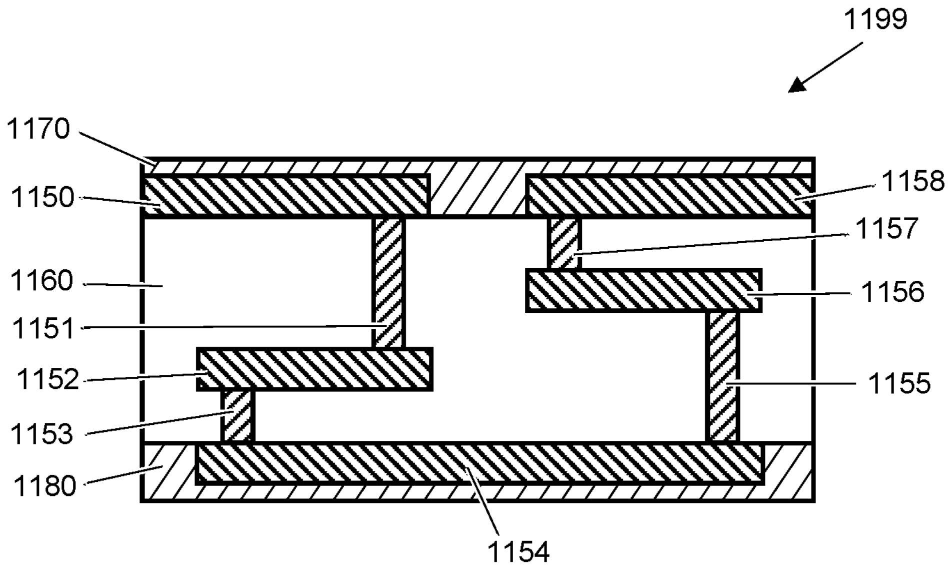
FIG. 11 illustrates a cross-section of even yet another example corrugated ground plane, wherein internal layers are used to increase path length within a corrugation, in accordance with at least one configuration disclosed herein.

Even yet another configuration of a corrugated ground plane is illustrated in the cross-sectional schematic of FIG. 11, such as corrugated ground plane 1199. The corrugated ground plane 1199 includes internal radial path segments that provide additional path length increase through increased design complexity in a same available radial length. The mechanism by which this is achieved includes internal layers, or radial path segments, that route a radio-frequency signal in a reverse direction from those shown in corrugated ground planes 199, 499, 1099 to increase overall path length. A first radial path segment 1150 enters from the left hand side at a top of a PCB substrate 1160 and couples or connects to a first via 1151. The first via 1151 then couples or connects to a second path segment 1152 which is disposed within the PCB substrate 1160 as a separate conducting layer below the top layer comprising the first radial path segment 1150. The current path then travels back towards the left towards a second via 1153, adding a lateral direction of travel to the overall path length of the traveling and/or standing wave currents. The second via 1153 then couples or connects to a third radial path segment 1154 positioned on the bottom conducting layer of the PCB substrate 1160. Because of the backwards lateral travel provided by the second path segment 1152, the third radial path segment 1154 travels a longer distance than would otherwise be available before reaching a third via 1155.

The third via 1155 continues the current path up to a fourth radial path segment 1156 positioned on a conducting layer internal to the PCB substrate 1160. In at least one configuration, the fourth radial path segment 1156 is fabricated on a conducting layer that is a different layer than the conducting layer used to fabricate the second radial path segment 1152. It is readily envisioned that in at least one configuration, the second and fourth radial path segments 1152 and 1156 are fabricated from the same internal conducting layer. The fourth radial path segment 1156 reverses direction of current travel again back towards the center of the corrugation shown.

A fourth via 1157 provides a coupling or connecting path for current back to the top surface of the PCB substrate 1160 where a fifth radial path segment 1158 is positioned. The fifth radial path segment 1158 completes the path travel structure of a single corrugation in at least one configuration of corrugated ground plane 1199. The electrically equivalent path length of the entire structure can be calculated as a series of dielectrically loaded paths available for travel, which includes the discontinuities provided by the transitions to the vias 1153, 1155, 1157, as well as the non-linear phase contributions resulting from the capacitive coupling provided between overlapping radial path segments.

In the example of FIG. 11, at least one configuration provides for the dielectric loading of a top soldermask 1170 of the first and fifth radial path segments 1150 and 1158. Similarly, at least one configuration provides for the dielectric loading of a bottom soldermask 1180 of the third radial path segment 1154. All radial path segments and vias are dielectrically loaded by the PCB substrate 1160, and all of these contribute to a shortening of the wavelength of traveling wave and standing wave currents that further increase the effective electrical length of the path.

The foregoing description merely explains and illustrates the disclosure, and the disclosure is not limited thereto except insofar as the appended claims are so limited, as those skilled in the art who have the disclosure before them will be able to make modifications without departing from the scope of the disclosure.

What is claimed is:

1. An antenna, comprising:

an axial helical radiating element to provide a radiation pattern substantially parallel to a primary axis of rotation of the helical radiating element;

a corrugated ground plane, disposed proximate to a back region of the axial helical radiating element, the ground plane comprising corrugations to increase an effective electrical length of travel for radial standing waves between an axial helical input, at which the axial helical radiating element is coupled to the corrugated ground plane of the antenna, to an outer edge of the corrugated ground plane, wherein corrugations of the corrugated ground plate include a plurality of rises electrically connected to a plurality of trenches; and a frame contact to couple a radiator frame to the corrugated ground plane, the frame contact being axially non-centered to provide capacitance to the corrugated ground plane.

2. The antenna according to claim 1, wherein the corrugated ground plane further comprises a dielectric substrate, the corrugations being radial path segments disposed on the dielectric substrate.

3. The antenna according to claim 2, wherein the dielectric substrate is a printed circuit board (PCB), with the radial path segments being a conductive material formed on the PCB.

4. The antenna according to claim 3, wherein at least one of a material thickness and a dimension of the radial path segment are quarter-wavelengths or harmonic of one or more frequencies of operation of the antenna.

5. The antenna according to claim 3, wherein the PCB includes at least one via to electrically and mechanically couple a first radial path segment disposed on a first side of the PCB to a second radial path segment disposed on a second side of the PCB.

6. The antenna according to claim 3, wherein the conductive material is at least one of copper, silver, aluminum, nickel, gold, an alloy of at least one of copper, silver, aluminum, nickel, gold, and a solder compatible with at least one of copper, silver, aluminum, nickel, and gold.

7. The antenna according to claim 3, wherein the radial path segments include at least one radial path segment that is embedded within the PCB substrate.

8. The antenna according to claim 1, wherein the corrugated ground plane is circular in shape.

9. The antenna according to claim 1, wherein the corrugated ground plane further comprises a central ground plane region, the axial helical input being disposed on the central ground plane region of the corrugated ground plane.

10. The antenna according to claim 1, wherein the antenna operates across at least one of Global Navigation Satellite System (GNSS) frequencies, global cellular bands, and Unlicensed National Information Infrastructure (UNII) bands.

11. The antenna according to claim 1, wherein the axial helical radiating element is a first axial helical radiating element, the antenna further comprising a second helical radiating element disposed proximate to the first helical radiating element and along a same centerline axis.

12. The antenna according to claim 1, wherein the plurality of rises includes three rises and the plurality of trenches includes three trenches.

13. The antenna according to claim 1, wherein the plurality of rises and the plurality of trenches are toroidal or ring-shaped.

14. The antenna according to claim 1, wherein the corrugated ground plane further comprising at least one threaded hole.

15. The antenna according to claim 1, wherein the corrugated ground plane further comprising at least one non-threaded mounting hole.

16. The antenna according to claim 1, further comprising a radiator frame to provide mechanical support to the axial helical radiating element.

17. The antenna according to claim 1, further comprising at least one through-hole for mechanical fixturing.

18. The antenna according to claim 17, wherein the at least one through-hole is one of conductive and isolated from the corrugated ground plane.

19. The antenna according to claim 1, wherein the corrugations include a first radial path segment and a second radial path segment, the corrugated ground plane further comprises passive radio-frequency circuitry disposed between the first and second radial path segments to provide frequency-varying phase advancement for surface currents.

20. The antenna according to claim 1, wherein the corrugated ground plane further comprises dielectric loading of the corrugations to reduce the effective wavelength of surface currents.

* * * * *